H. A. MARTIN.
MULTIPLE COUNTER CASH REGISTER.
APPLICATION FILED AUG. 31, 1912.

1,232,705.

Patented July 10, 1917.
18 SHEETS—SHEET 3.

Witnesses
H. F. Sadgebury
J. B. Ricketts

Inventor
Haakon A. Martin
by R. Orlow
C. H. Braselton
Attorneys

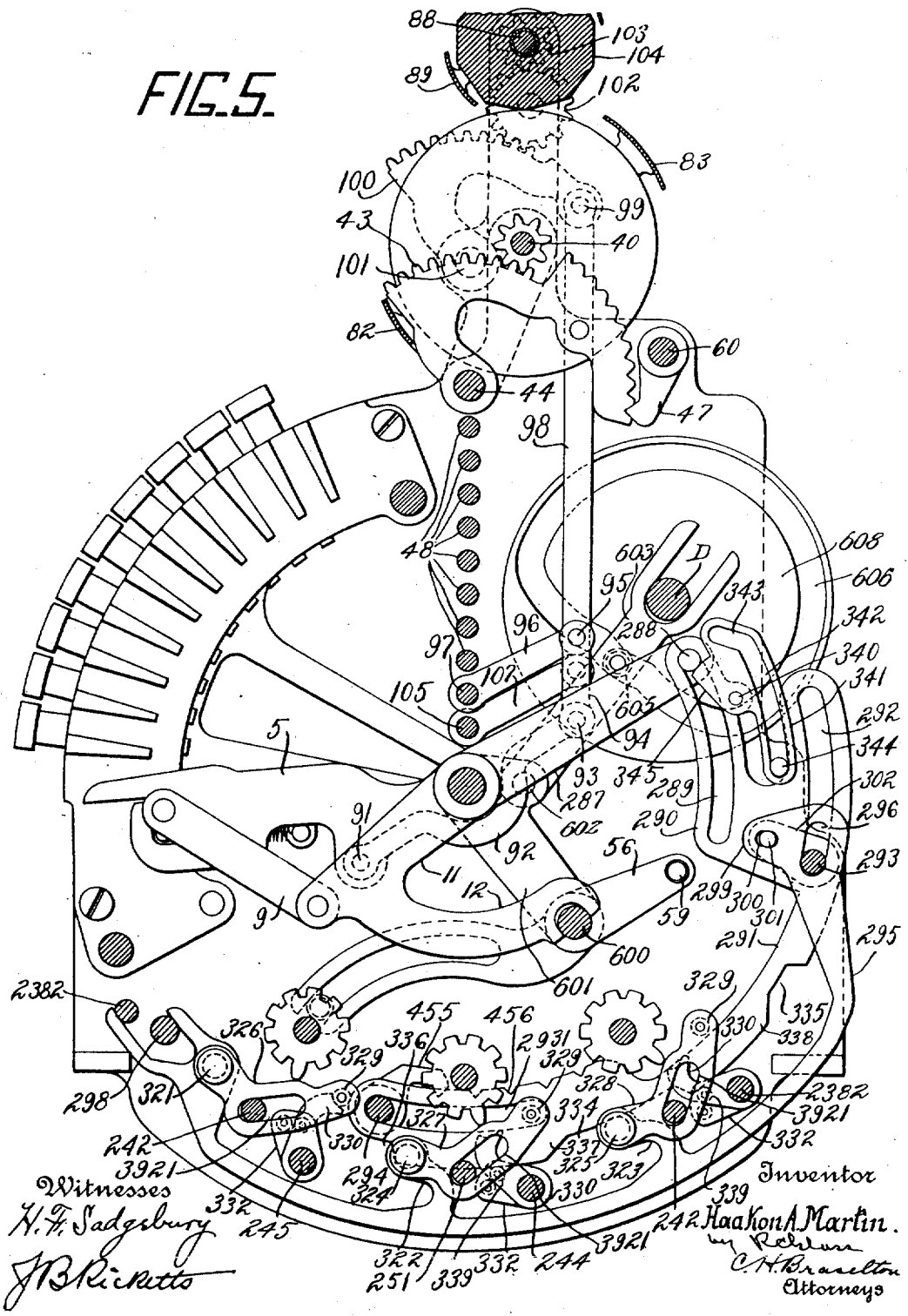

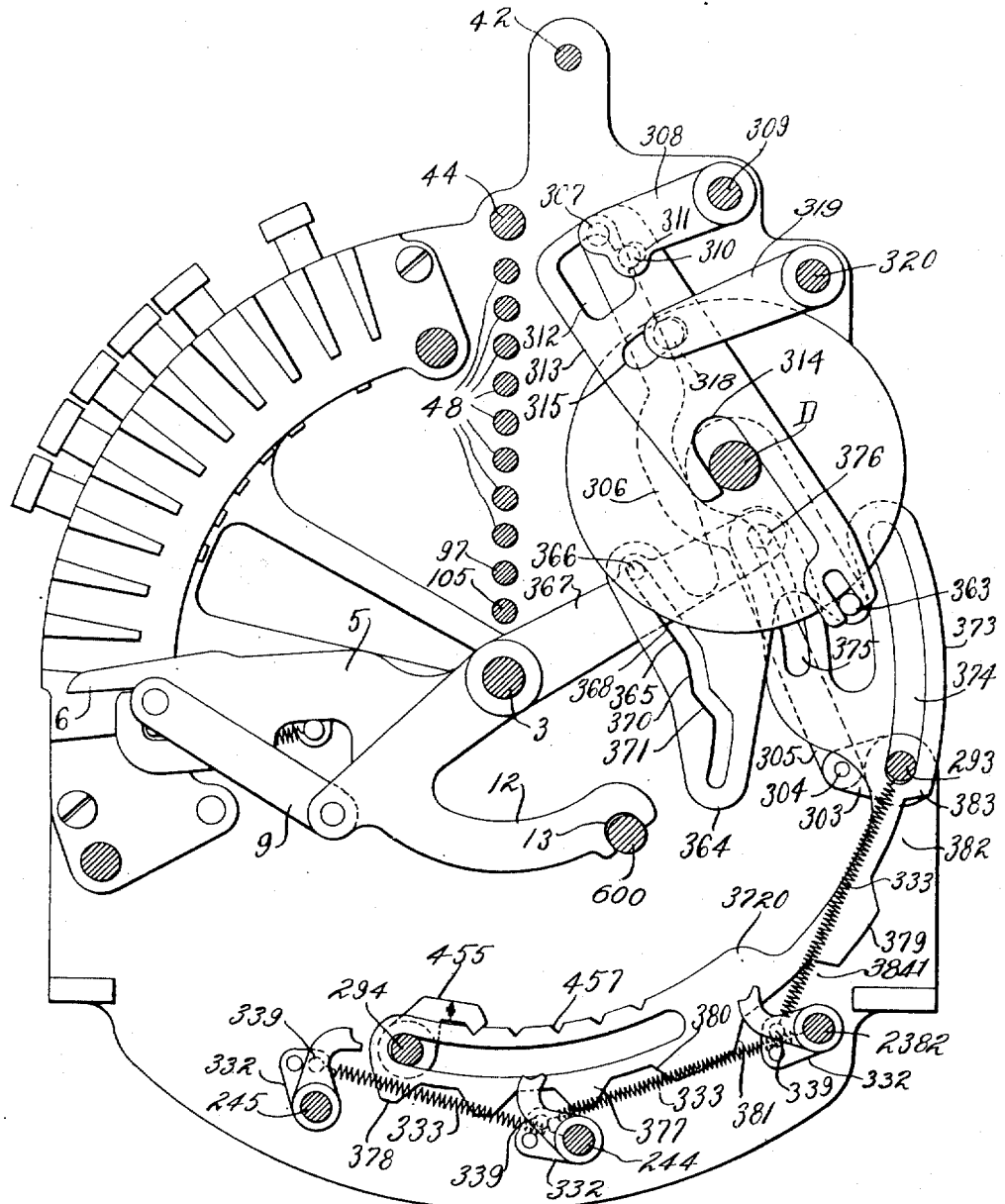

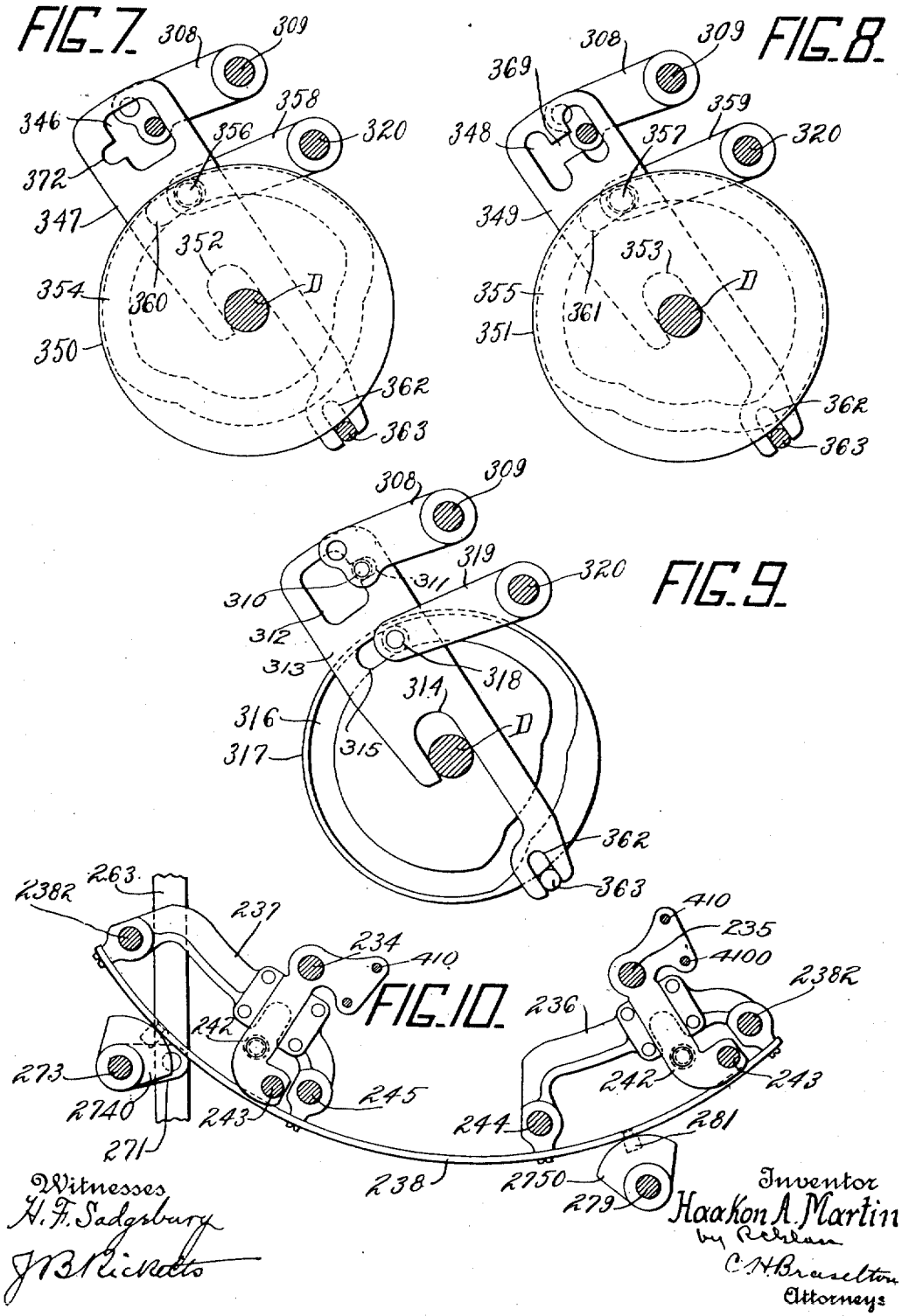

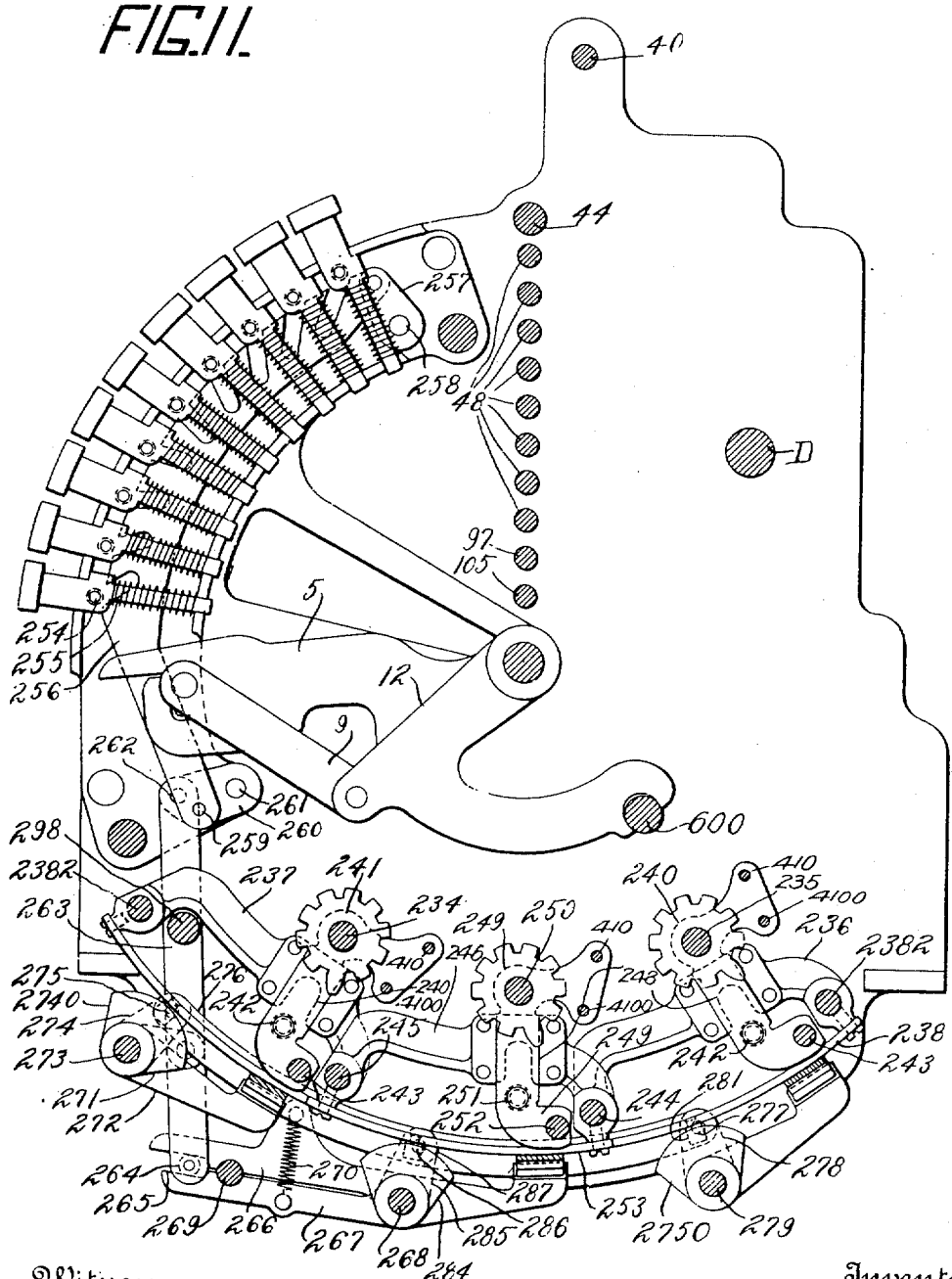

H. A. MARTIN.
MULTIPLE COUNTER CASH REGISTER.
APPLICATION FILED AUG. 31, 1912.
1,232,705.
Patented July 10, 1917.
18 SHEETS—SHEET 8.
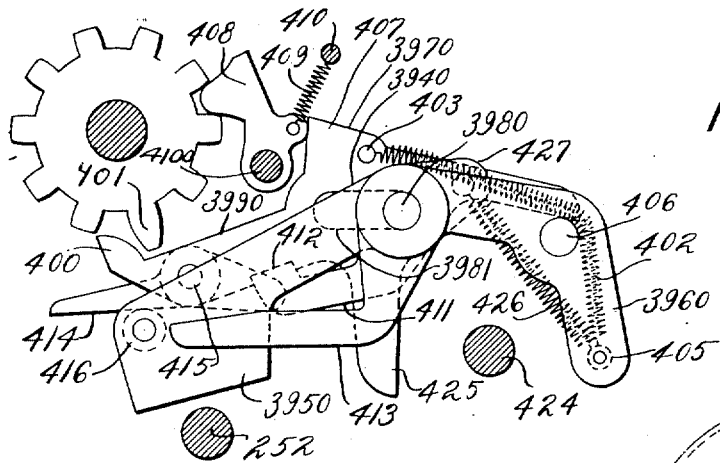
FIG.12.
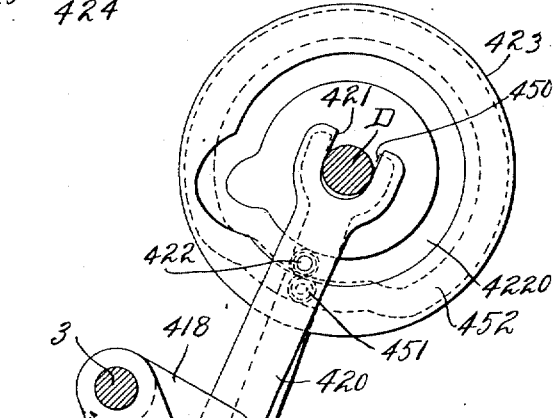
FIG.13.
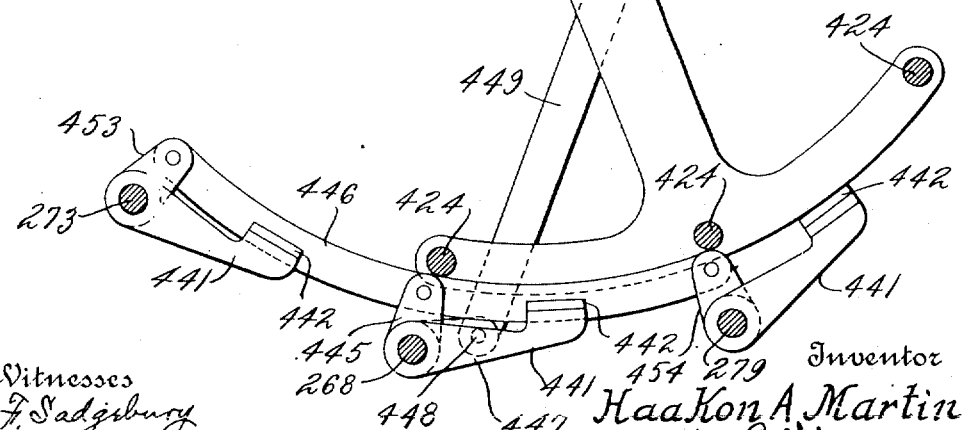
Witnesses
H. F. Sadgebury
J. B. Ricketts
Inventor
Haakon A. Martin
by R. Nolan
C. H. Braselton
Attorneys

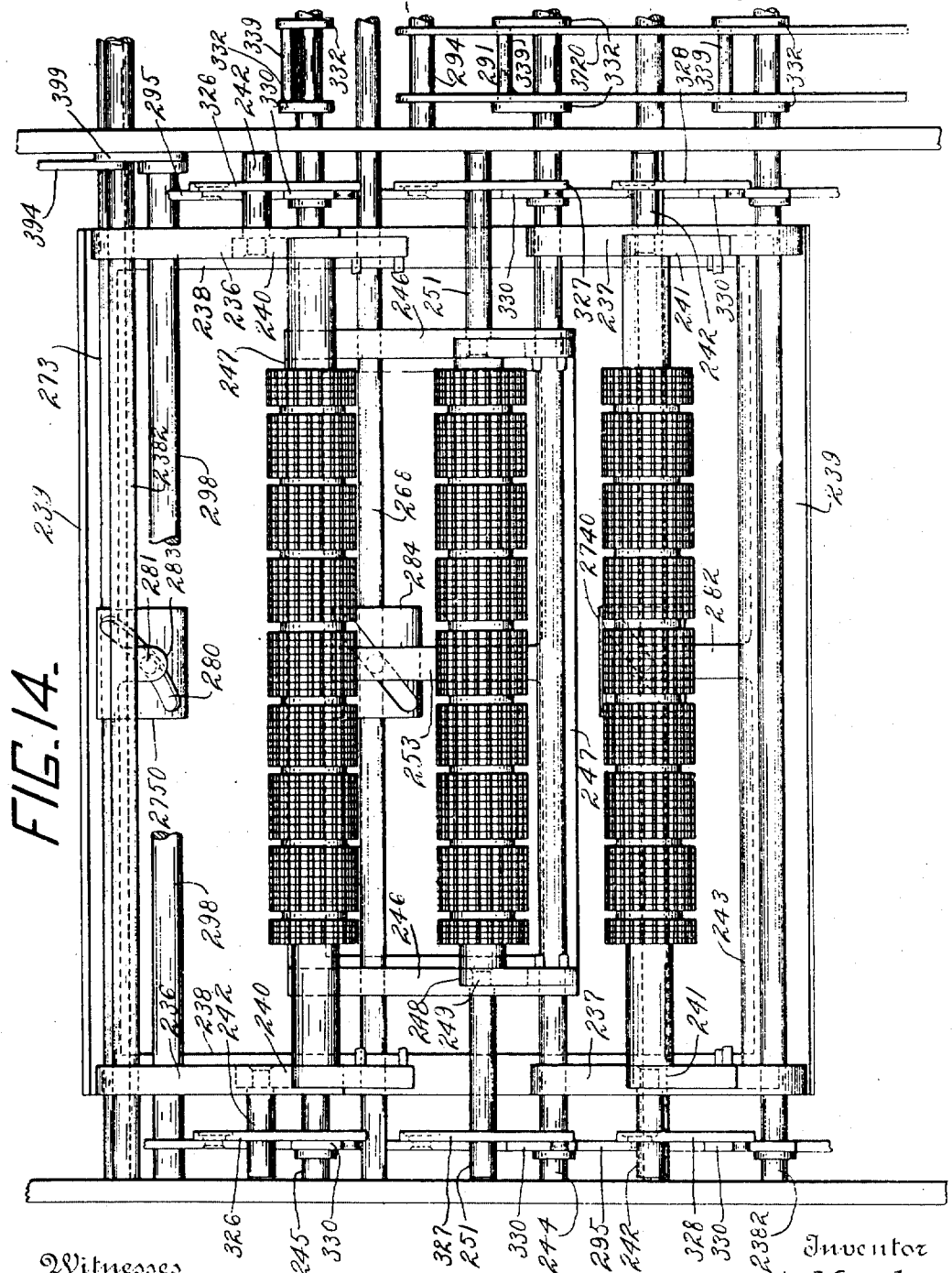

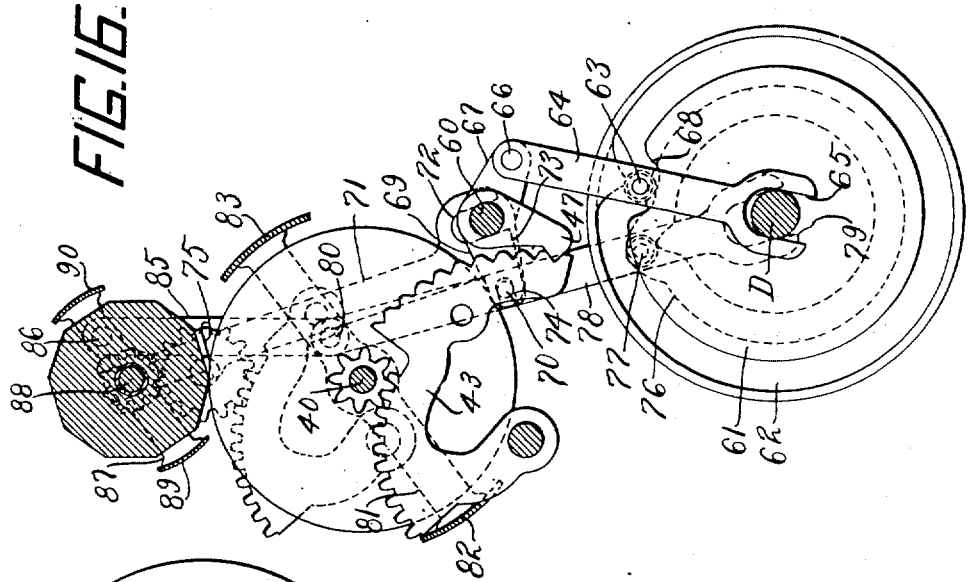
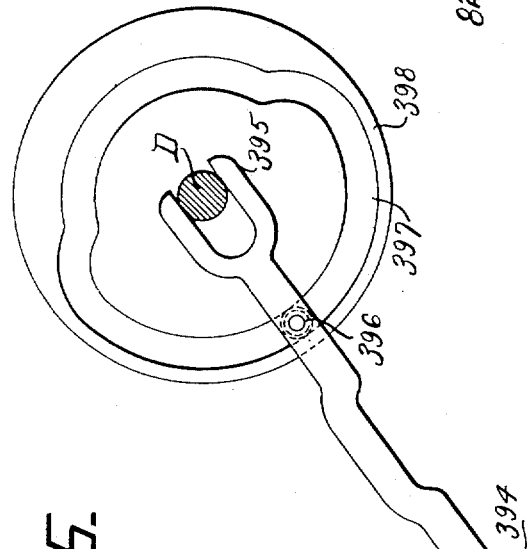
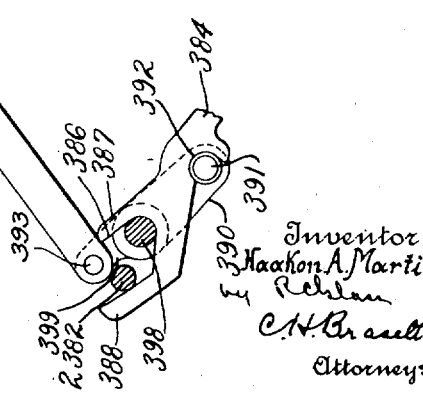

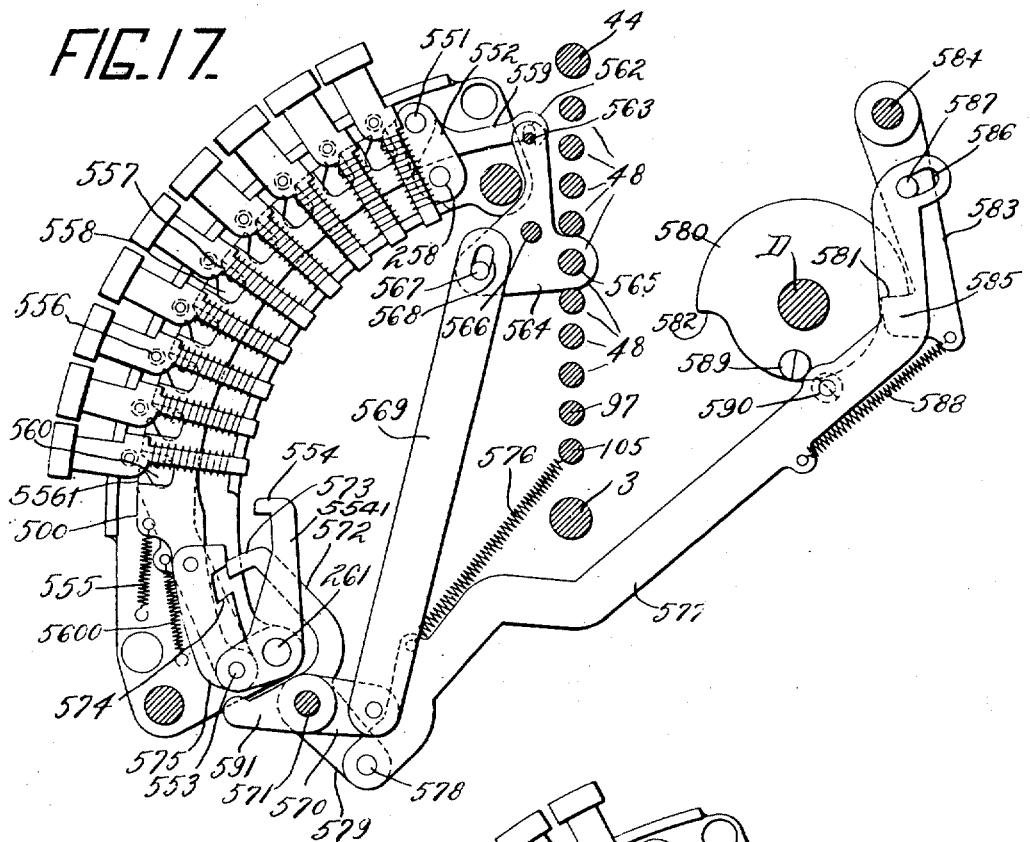

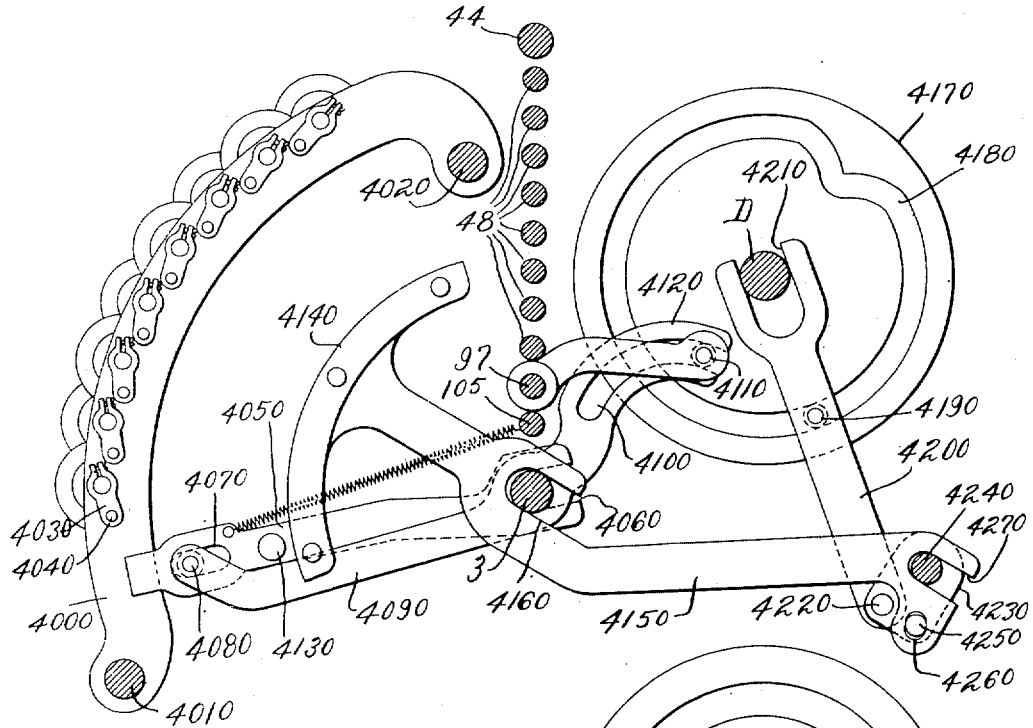
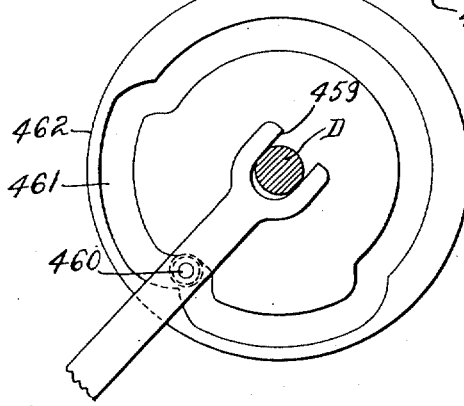
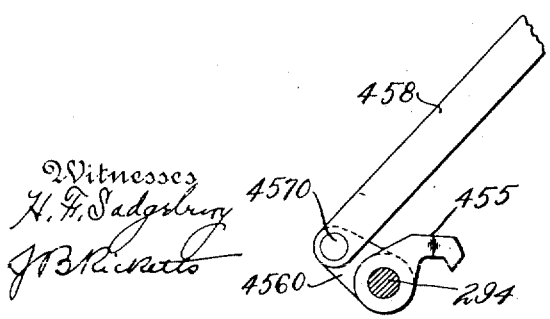

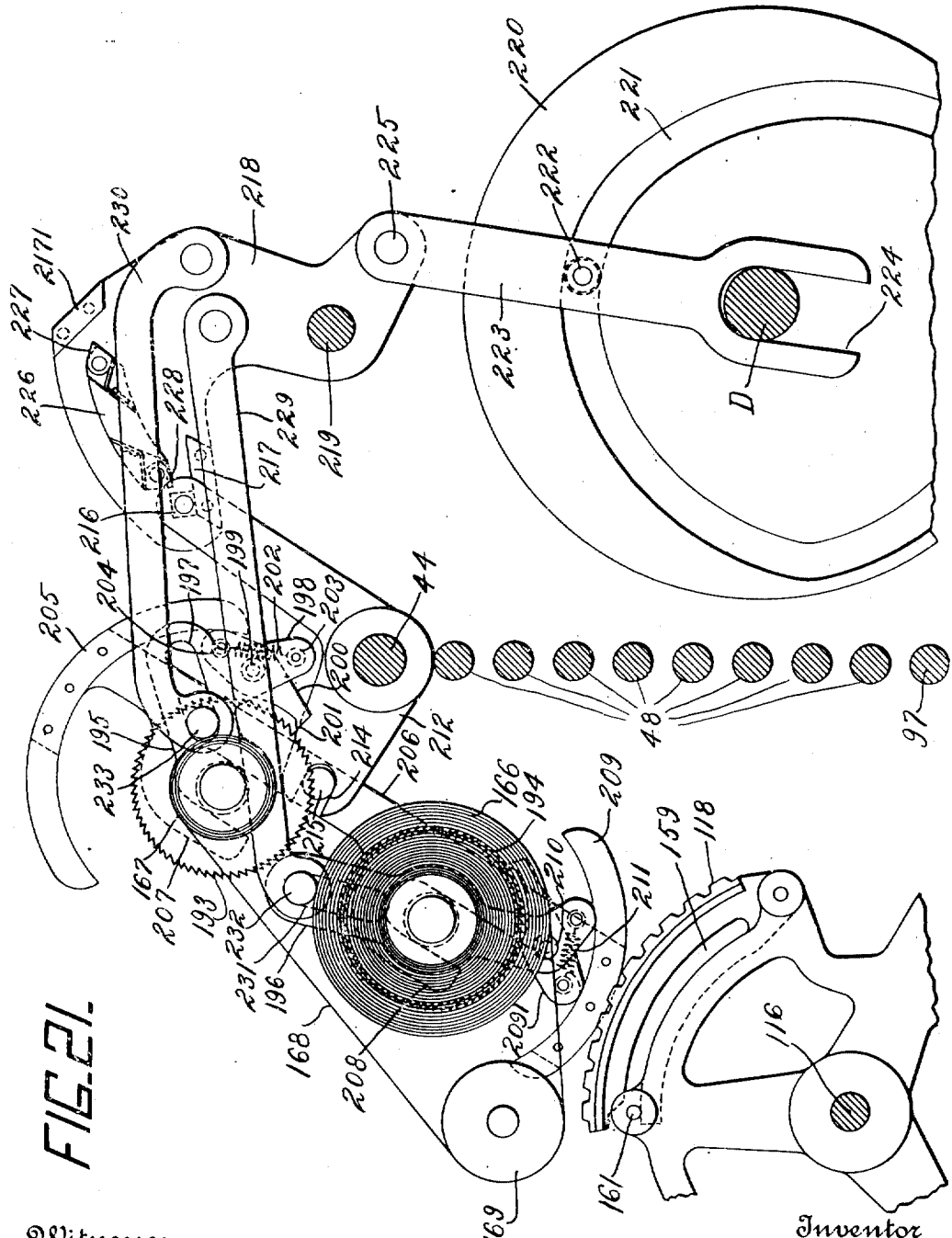

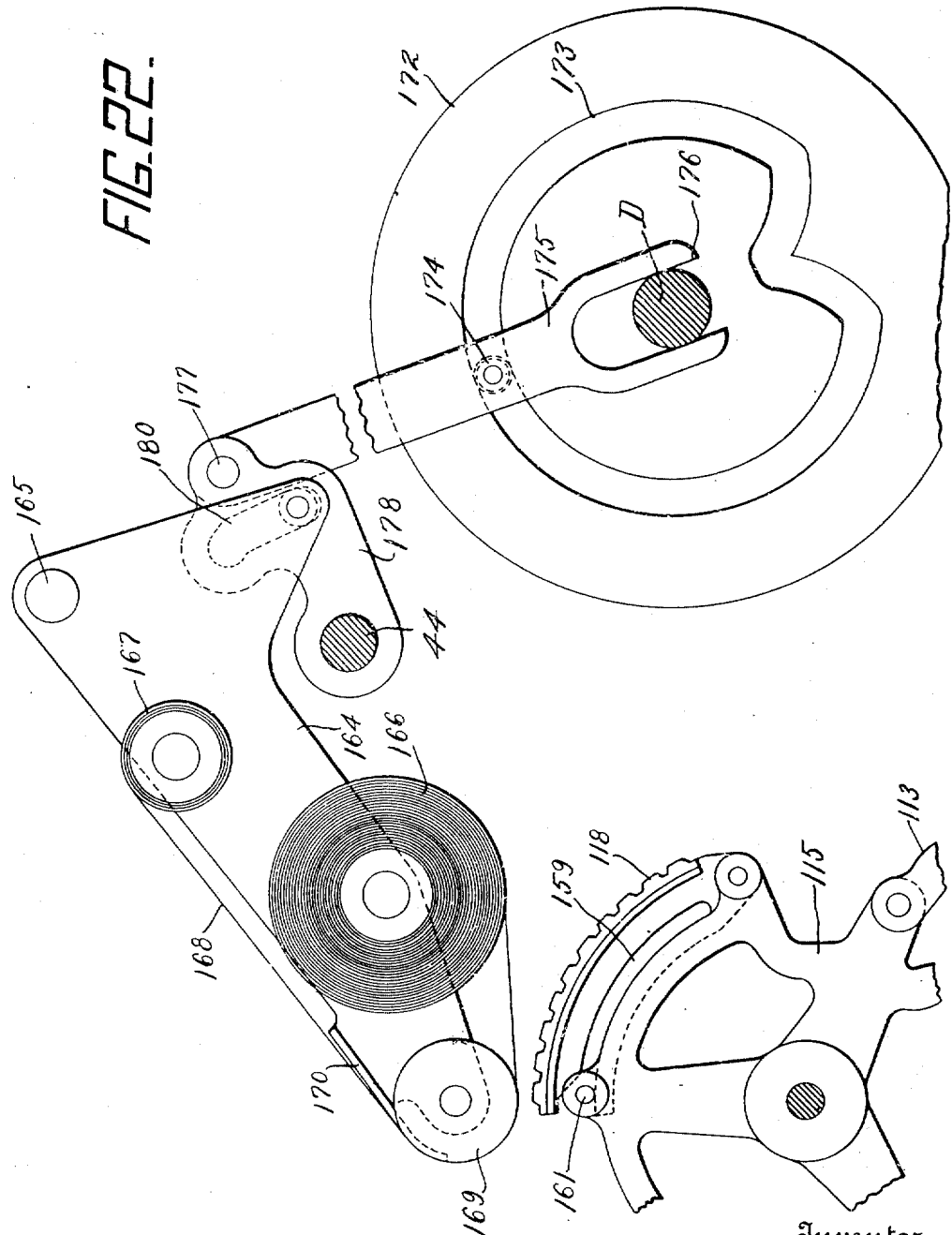

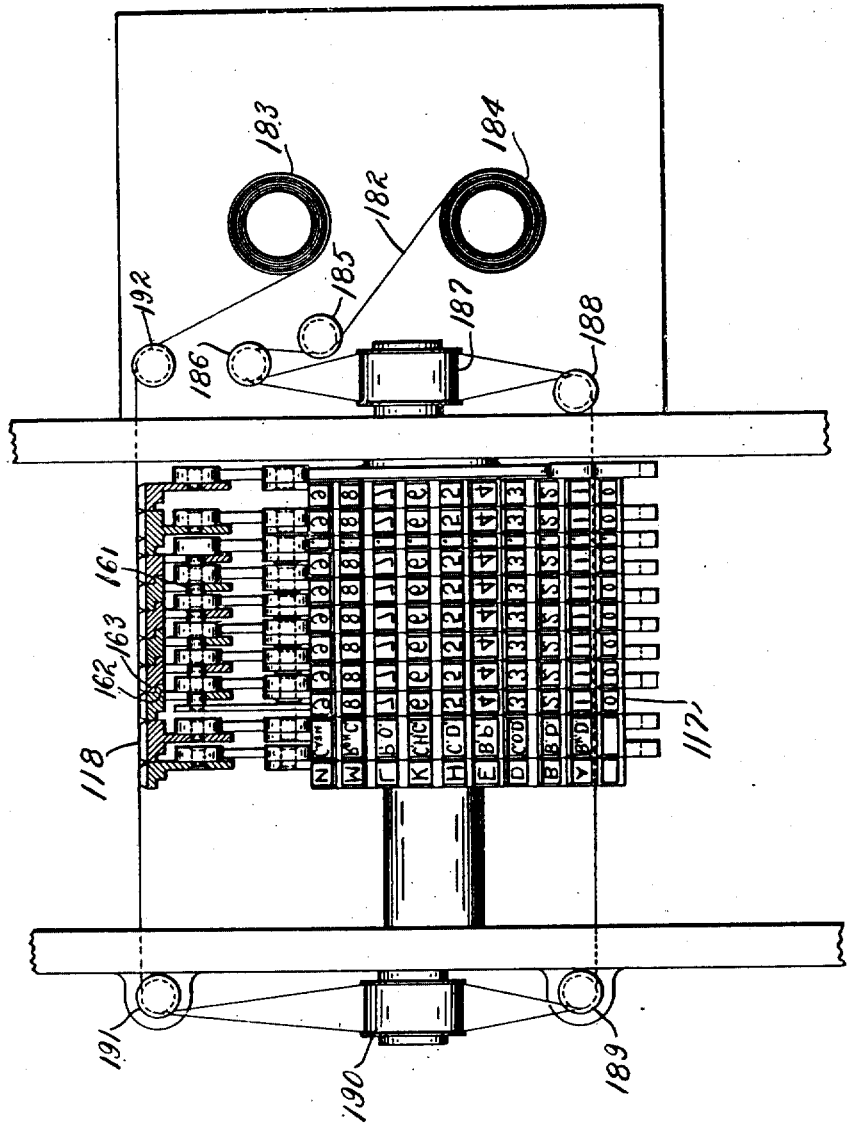

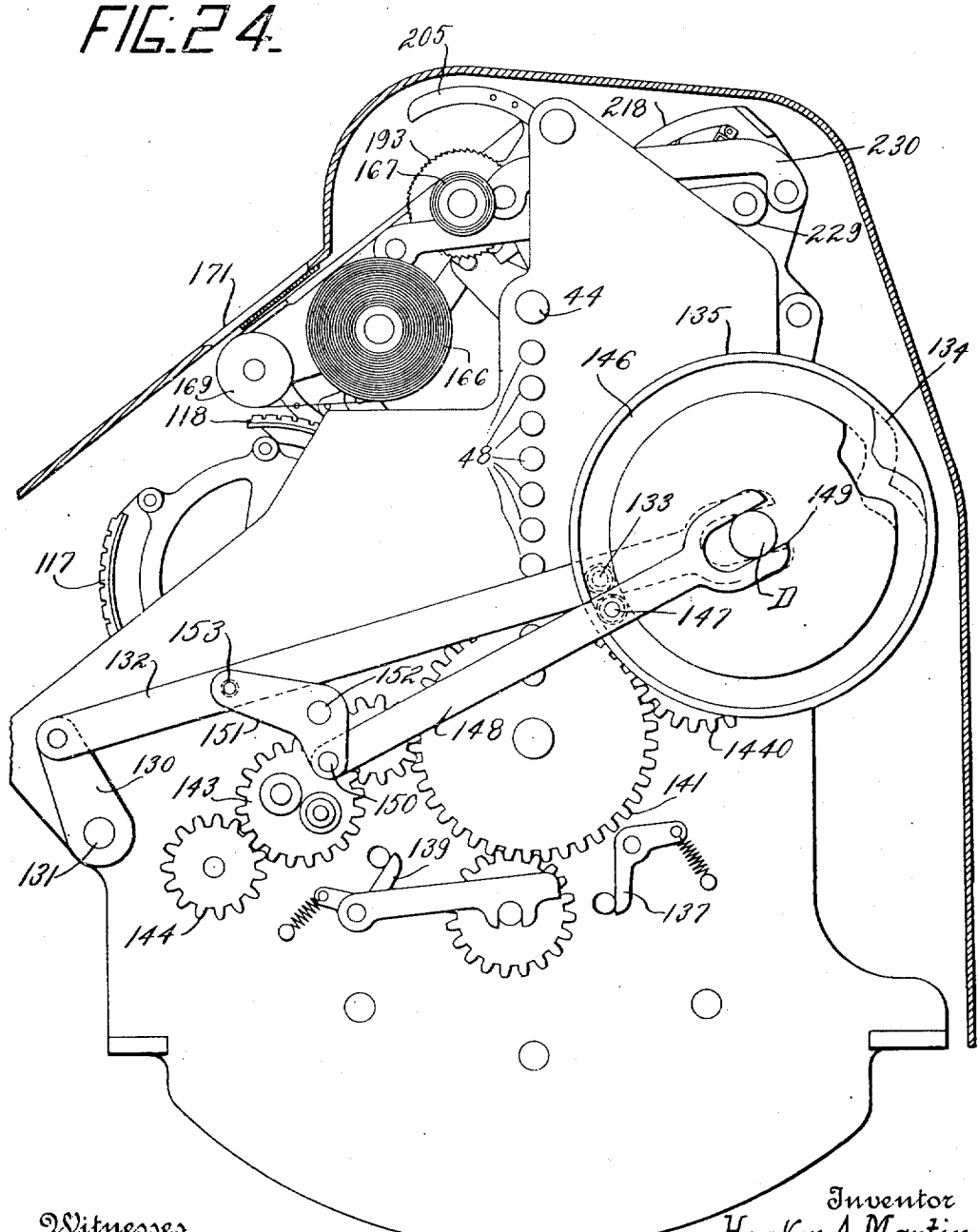

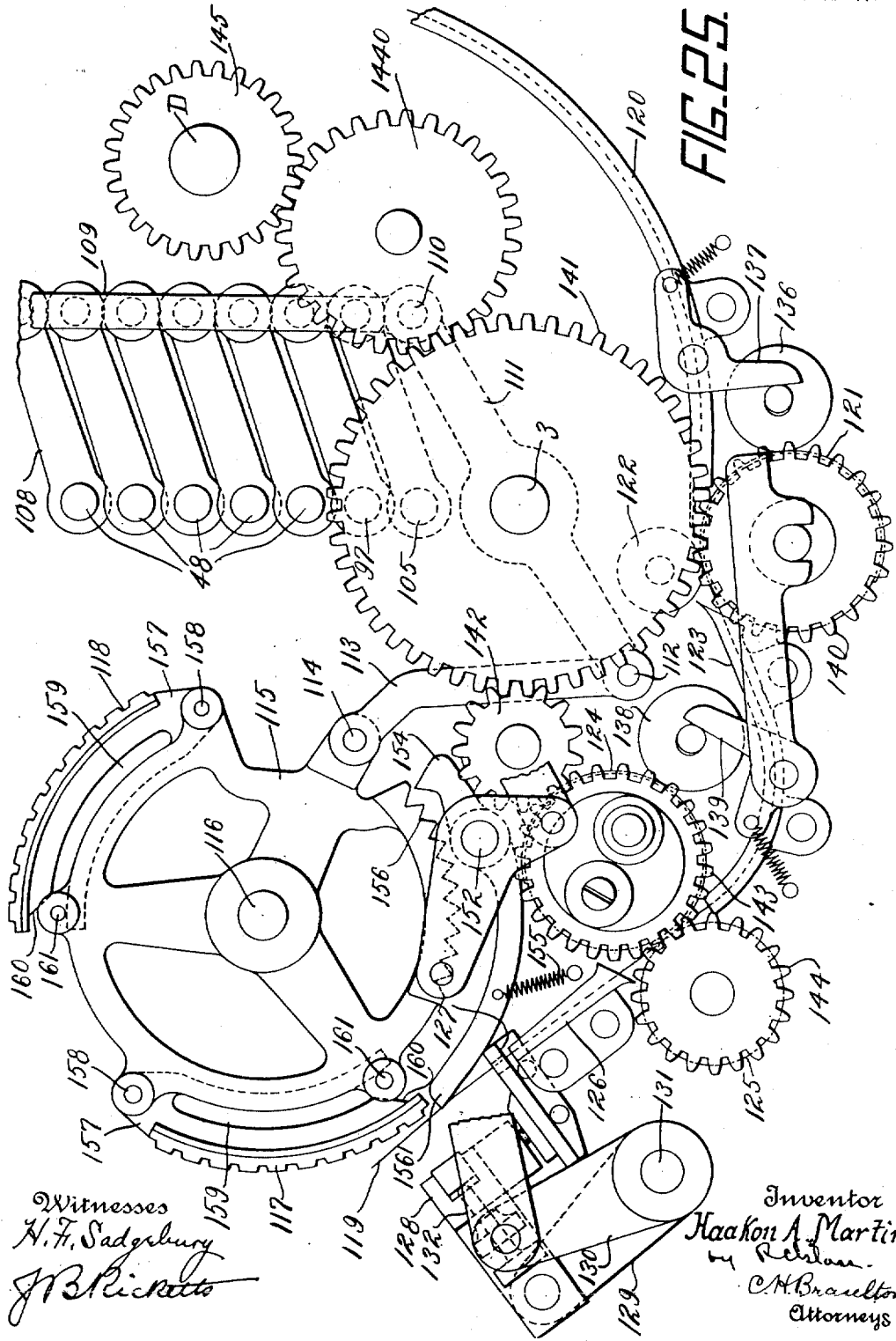

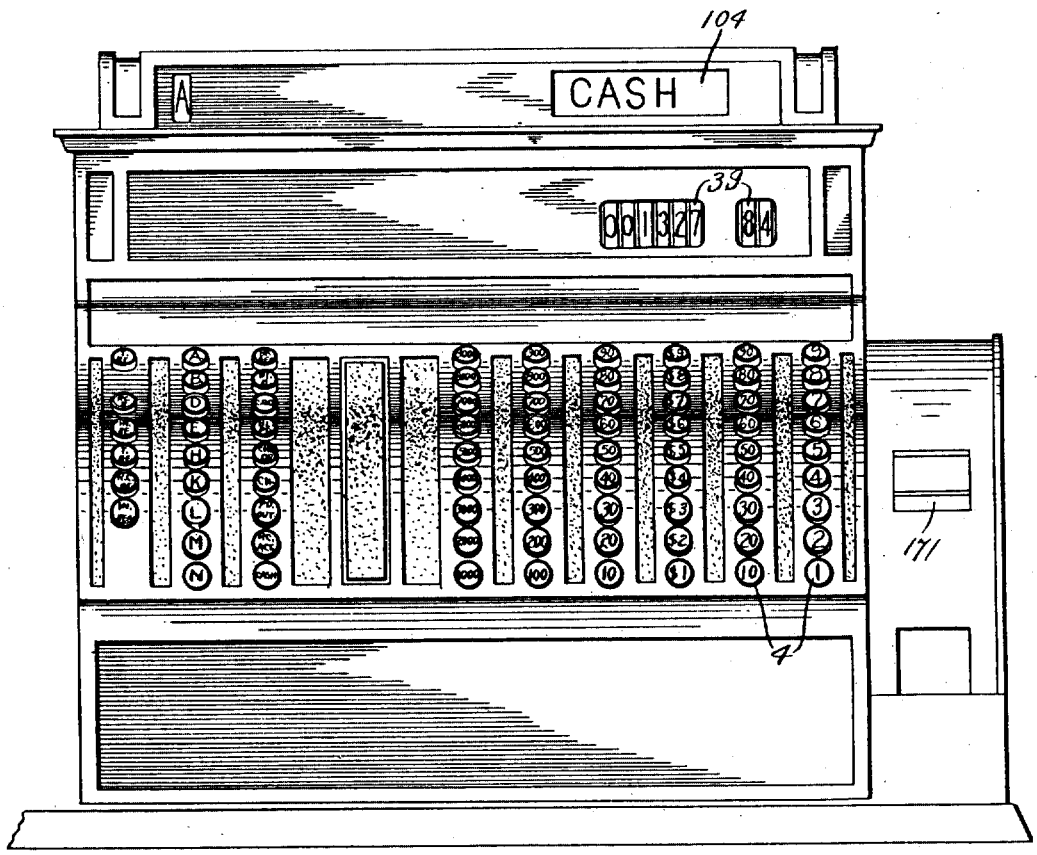

UNITED STATES PATENT OFFICE.

HAAKON A. MARTIN, OF DAYTON, OHIO, ASSIGNOR TO THE NATIONAL CASH REGISTER COMPANY, OF DAYTON, OHIO, A CORPORATION OF OHIO, (INCORPORATED IN 1906).

MULTIPLE-COUNTER CASH-REGISTER.

1,232,705. Specification of Letters Patent. Patented July 10, 1917.

Application filed August 31, 1912. Serial No. 718,065.

*To all whom it may concern:*

Be it known that I, HAAKON A. MARTIN, a citizen of the United States, residing at Dayton, in the county of Montgomery and State of Ohio, have invented certain new and useful Improvements in Multiple-Counter Cash-Registers, of which I declare the following to be a full, clear, and exact description.

This invention relates to cash registers and particularly to that type embodying a plurality of totalizers for variously classifying the amounts of the transactions handled by the machine. In this machine a set of separate totalizers are provided for accumulating the grand totals of the amounts of all similar transactions and in addition two sets of clerks' individual totalizers are supplied one set for accumulating the individual clerks' cash sales and the other for accumulating the individual clerks' "received on account" transactions. Incidental to this provision and arrangement of totalizers, novel selecting mechanism for them has been developed which provides for throwing into engagement with the actuators the desired clerk's individual cash totalizer along with the throwing in of the totalizer which accumulates a grand total of all cash transactions, and for throwing in of the desired clerk's individual "received on account" totalizer whenever the totalizer for accumulating a grand total of all "received on account" transactions is connected with the actuators. This is accomplished broadly by the use of a selective controlling bar for the sets of totalizers which is differentially moved when "cash", "received on account" or other transactions are entered, the extent of which movement determines whether either of the clerks' individual sets of totalizers will be engaged with the actuators along with the engagement of the transaction set and in case one of these sets is to be also actuated, whether it is the clerk's individual cash, or the clerk's individual received on account set.

To provide an improved type of differential mechanism was also an object of this invention, and such is herein disclosed in a key controlled embodiment though its adaptation to other types of control, such as lever control, will be readily apparent. Its structural novelty resides in a link, toggle or equivalent connection between a driving member having a constant movement at each operation, and a member adapted to be given differential movement thereby, such that normally a positive driving connection between these members is provided by the end of the toggle or link engaging the driven member, but which driving connections may be rendered ineffective, at different points in the movement of the driving member by freeing the end of the toggle or link which engages the driven member so as to permit further movement of the driving member independent of the driven member, the freed end of the toggle or link normally engaging the driven member, deflecting from its point of driving engagement with the driven member during such further movement of the driving member.

This invention further presents a novel and improved form of transfer mechanism for taking care of the necessary "carries" between wheels of lower order to those of next higher. This novel form does not provide separate transferring mechanisms for all of the totalizers but in the arrangement shown only the elements of one totalizer in each group of totalizers are in operative alinement with the common transfer mechanisms for that group at one time. Long teeth on the totalizer wheels when the latter pass from "nine" to "zero", trip their transfer mechanism allowing the transfer pawls of the latter to recede and engage behind one of the teeth on the wheels, after which the transfer mechanism with its pawl is restored to normal position by the oscillation of a frame.

In the machine of this invention all of the totalizers may be reset at zero or turned to zero and read and then returned to their original position by operations of the machine which result in the printing of the amounts standing on the totalizers prior to the operations. To provide for such operations of the machine it is provided not only with the usual amount, transaction, and clerks' banks of keys, but also with a special read and reset bank of keys which in connection with the clerks' and transaction banks of keys determines the totalizer to be read or reset at zero. This read and reset bank of keys controls the differential movement of a read and reset counter selecting bar the different positions of which in combination with the different positions of the selector bar for the transaction bank of keys above mentioned, provides for the reading or resetting of any of the amount counters of the machine. The selector bar controlled from the read and reset bank of keys is necessary because of the fact that the selector bar used in entering transactions provides for throwing in engagement with the actuators both the transaction set of totalizers and one or the other of the sets of clerks' individual totalizers in some operations of the machine. This would not be permissible in "reading" or "resetting" operations so the "read" and "reset" selector bar serves to prevent more than one totalizer being engaged with the actuators at any time in such operations. These read and reset keys also control the time of engagement of the totalizers with the actuators by disconnecting an adding cam normally in position to engage the totalizers with the actuators on the return stroke of the latter, and connecting either a "read" or "reset" cam for controlling the time of engagement of the totalizer with the actuators.

Further objects of the invention are to provide in the printing mechanism an improved construction for preventing the printing of ciphers by the type segments of higher order than those indicating other amount characters, and to provide for the printing of ciphers by those type carriers of lower order than the highest indicating other than zero when such lower order type carriers are not adjusted to print characters other than zero. In the machine of this invention, this is provided for by mounting the type characters on bars pivotally supported and carried by differentially adjustable segments, which bars are free to yield against the printing impression of the platen when they are in zero position, so as to prevent the taking of printing impressions therefrom, but which are adapted to be supported against such yielding whenever any type segment of higher order is moved to other than zero position. Projections on the pivoted type bars engage beneath the type bars of next lower order and pins on the segments engage beneath the type bars of the segments of next lower order whereby. when a segment is moved from zero position the one next higher standing at zero, its type bar will be supported by the pin projecting from the next higher segment and this supported bar through the connection between the pivoted bars thus supports all of those of lower order.

A still further object of this invention was to provide an improved form of record strip feeding mechanism by which in operation the record strip is reversely fed to a slight extent to position it for receiving a printing impression after which impression it is fed in a forward direction to an extent greater than that of its reverse feed before printing, thus taking care of the necessary general feed in a forward direction. In the mechanism herein disclosed these feeding movements of the record strip are accomplished by rotating the supply roll for the record strip to pull the latter rearwardly previous to printing and rotating the receiving roll after such printing to draw the paper forwardly the latter roll being rotated in this movement to an extent sufficient to pull the paper forward farther than it was drawn reversely by the supply roll. A common oscillating member is provided which is connected by links with pawl carrying frames for rotating the rolls and thus serves to rotate the latter at desired times. The link for the receiving roll is connected with the oscillating member at a point farther from the axis of the latter than is the point of connection of the other link, thus providing for a greater feed of the strip by the receiving roll than by the supply roll. The other ends of the links are connected with the pawl carrying frames by pins working in slots in the frames, which pins are also adapted to rest on the record material on the rolls the amount of which thereon serves to control their extent of rotation thus tending to equalize the feed of the record strip which would otherwise vary with the diameter of the rolls.

The machine of this invention also embodies an improved construction for setting the indicator elements in accordance with the differential setting of their actuators which improved construction employs arms mounted for oscillation on the driving member for the actuators, and rigid with arms having cam slots which slidably engage over stationary members so that as the arms having the cam slots are carried with the driving member they will cause the first mentioned arms to engage and serve to normally position the intermediate portions of links connecting the indicating elements with their actuators.

The invention also includes a novel construction by which depression of a clerk's key serves to unlock the machine for operation and through which near the end of the operation, depressed keys are released. In the form disclosed for accomplishing these results the clerk's detent plate is provided with a notch normally out of alinement with a pawl rigidly carried by an oscillatory shaft. This shaft also carries an arm connecting with a spring controlled link which also connects with machine locking mechanism. When the clerk's detent plate is raised by depression of a key its notch comes opposite its coacting pawl thus permitting the link to move under force of its spring, to unlock the machine, the accompanied rotation of the oscillatory shaft also serving to actuate a plate to lock the manipulated key depressed. Reverse operation of these parts is effected near the end of the operation of the machine by a projection on a rotating member, which restores the parts to normal position, thus releasing depressed keys.

With these and incidental objects in view, the invention consists in certain novel features of construction and combinations of parts, the essential elements of which are set forth in appended claims, and a preferred form of embodiment of which is hereinafter described with reference to the drawings which accompany and form part of this specification.

Fig. 5 represents a section through the machine at the side of and looking toward the bank of transaction keys showing the counter selecting mechanism which is controlled from these keys.

Fig. 6 represents a section through the machine at the side of and looking toward the bank of "read" and "reset" keys.

Figure 1:
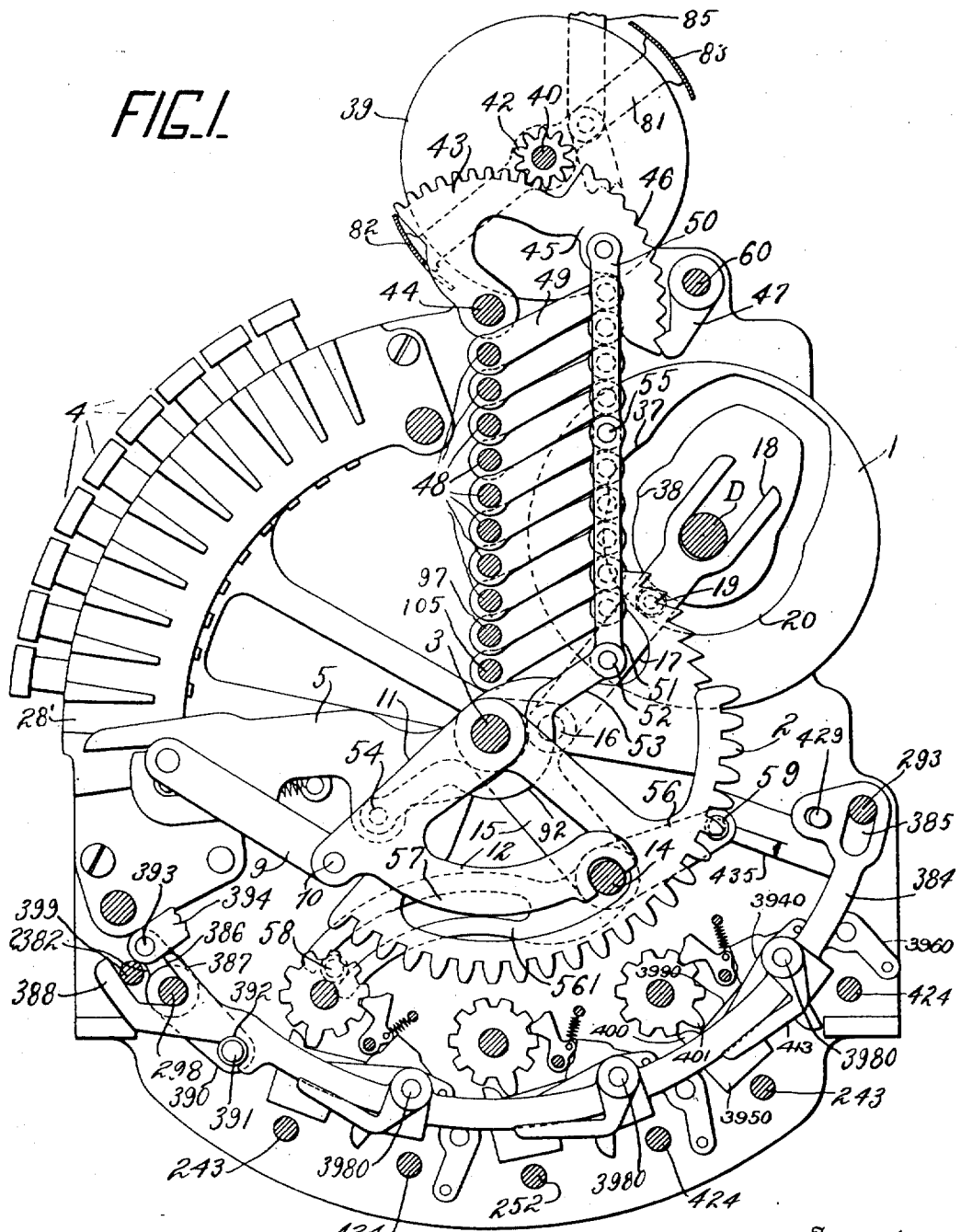
Figure 1 is a section through the machine at one side of and looking toward a bank of amount keys.

Figs. 7, 8 and 9 respectively show the reading, resetting and adding cams and their associated connections for controlling the time of engagement of the counters with their actuators.

Fig. 10 is a sectional view showing the frame carrying the clerks' individual "cash" and clerks' individual "received on account" counters and the cams for laterally shifting these counters.

Fig. 11 is a sectional view taken at the side of and looking in the direction of the bank of clerks' keys showing the manner of control by these over the sets of clerks' individual totalizers.

Fig. 12 is an enlarged view of the transfer mechanism.

Fig. 13 is a view showing the oscillatory restoring frame for the transfer mechanism and also the alining mechanism for the counters.

Fig. 14 is a top plan view showing the arrangement of the counters and their supporting frames.

Fig. 15 is a detail showing the means for restoring, and holding restored, parts of the turn to zero mechanism.

Fig. 16 shows the alining mechanisms for the amount and special transaction indicators and also the means for operating the indicator flashes.

Fig. 17 is a view of the bank of clerks' keys showing their control over the locking mechanism of the machine and the locking of depressed keys.

Fig. 18 is a view of a bank of amount keys showing the detent and locking plates broken away at opposite ends and the control of the former of these plates over the zero stop for the differential mechanism.

Fig. 19 illustrates the series of customer counters and the means by which they are actuated.

Fig. 20 is a detail of the alining pawl for the counter selecting bars and its operating means.

Fig. 21 is a view of the feeding mechanism for the record strip.

Fig. 22 shows the printing mechanism and means for operating the platen to take an impression.

Fig. 23 is a front view of the type carriers and the printing type segments showing, however, the forward ends of the set of the pivoted type bars for printing on the record strip and carried by the segments in section.

Fig. 24 is a view of the right side of the machine with this portion of the casing removed.

Fig. 25 is a view of the lower portion of the same as it would appear with the end frame removed.

Fig. 26 is a front elevation of the machine showing the cabinet in position.

The machine is provided with three sets of grouped sliding counters, one of which sets is utilized for accumulating in separate counters thereof the cash sales of the individual clerks, another is used for similarly accumulating separately the individual "received on account" transactions of the different clerks and a third set is utilized for accumulating grand totals of the amounts of the different kinds of transactions such as "cash," "received on account," "paid out," "charge," "checks drawn," "bills paid," "collect on delivery," "bills due," etc. The clerks' individual cash and clerks'individual received on account groups of totalizers are simultaneously positioned laterally with respect to their actuators by the depression of the clerks' keys and a similar lateral movement and adjustment of the set of transaction counters is effected by depression of the transaction keys. Whenever a cash transaction is entered in the machine by the depression of the cash key of the transaction bank and the proper clerk's key, the cash totalizer of the transaction set is always brought in mesh with the actuators which cause this totalizer to always represent a total of all of the clerks' individual cash totalizers. Likewise in entering clerks' individual received on account transactions, the transaction set of totalizers is shifted to the "received on account" position and the "received on account" totalizer of this transaction set is engaged with the actuators along with the engagement of the selected clerk's individual "received on account" totalizer so as to provide a grand accumulation of the accumulations on the clerks' individual "received on account" totalizers. When transactions other than "cash" or "received on account" are entered, the clerks' individual "cash" and "received on account" sets of totalizers are not brought into mesh with the actuators but only the selected transaction totalizer.

Amount and special transaction indicators are provided for the machine which are controlled from the differential mechanisms of the amount and transaction banks of keys. It also contains printing mechanism for printing the amounts of all transactions as well as the total standing on any of the counters. This printing of the totals accompanies operations for reading the counters and also for taking grand totals of amounts thereon in which the counters are left at zero after the total taking operations. Besides the usual amount, transaction and clerks' banks of keys an additional read and reset bank is provided, which, in connection with the transaction and the clerks' keys selects the various counters for total taking operations. The machine is designed to print both on a record strip retained in the machine and upon a check strip, the printing on the latter accompanied by the ejection of a check taking place at such operations of the machine as is desired.

Amount differential mechanism.

Figure 2:
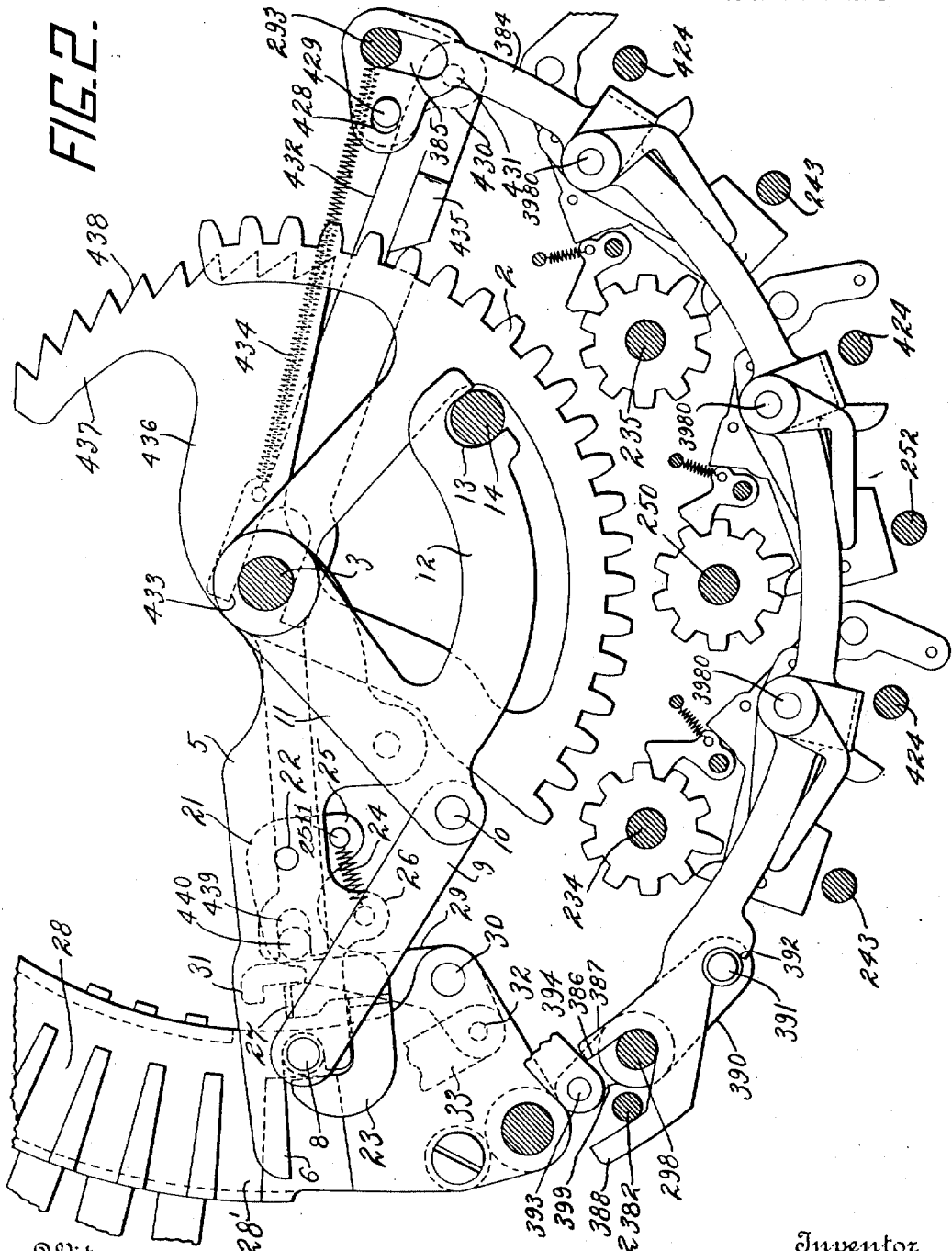
Fig. 2 is a similar section showing only the lower portion of the machine and bringing out more clearly the construction of the differential mechanism and the turn to zero mechanism.
Figure 4:
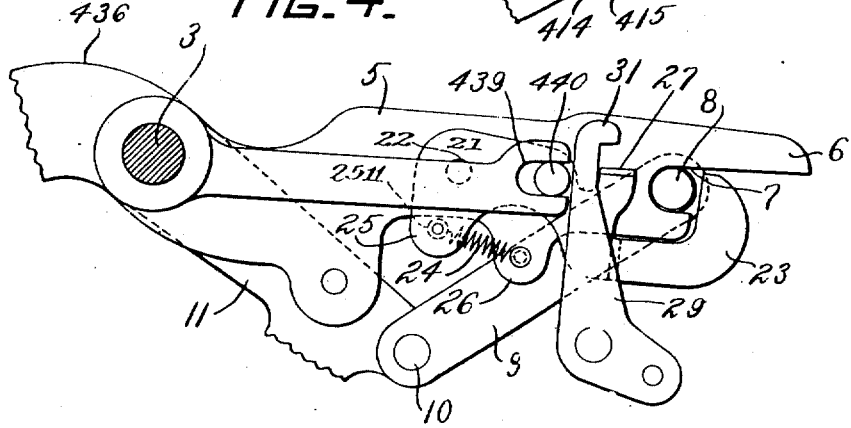
Fig. 4 shows a portion of the differential and turn to zero mechanisms as they appear looking in the opposite direction from Fig. 2.

The differential mechanism for all the amount banks of keys is the same and by reference to Figs. 1, 2 and 4 the construction and operation of this mechanism may be readily understood. In the first of these figures, as also throughout the drawings, "D" indicates the main drive shaft of the machine. This shaft through cams 1 rigidly mounted thereon one near each end of the differential mechanism is adapted to impart oscillatory movement to gear segments 2 corresponding in number to the number of banks of amount keys loosely carried by the central shaft 3 of the machine. The extent of this movement of gear segments is determined by the depression of amount keys 4 but is always as much as one step, which distance they move when no amount keys of their corresponding banks have been manipulated. The segments 2 are rigid with arms 5 which oscillate about the shaft 3 and the gear segments 2 will thus always have simultaneous movement with this arm and to the same angular extents. As shown most clearly in Figs. 2 and 4, the end of this arm 5 is provided with a projection 6 and a notch or recess 7 there beneath. A roller 8 projecting from the side of one end of a link 9 normally rests in the recess 7, the other end of which link is pivotally connected at 10 to an arm 11 also loosely mounted on the shaft 3. This arm is provided with a curved rearwardly projecting extension 12 provided with a recess 13 on its convex edge. A rod 14 extends longitudinally of the machine and is located within these recesses of all the arms 12 of the amount differential mechanism but not in similar recesses in similar arms of the differential mechanism for the transaction and turn to zero banks of keys. This rod is supported at its ends by corresponding arms 15 loosely carried by the central shaft 3, the oscillation of which arms oscillates the rod about the shaft 3 carrying with it the arms 11. The arms 15 pivotally connect at 16 (Fig. 1) with corresponding links 17, which are provided with slots 18 at their opposite ends working over the drive shaft D and adjacent the cams 1. There are two of the cams 1, one for each set of the arms 15 and links 17 and these cams are separated on the shaft D, a distance substantially the length of the rod 14. The links 17 are each provided with a roller 19 projecting from their sides and into cam grooves 20 in the sides of the cams 1. The shape of the grooves 20 in the cams 1, is such that in one complete rotation of the drive shaft D these cams will oscillate the arms 15, the rod 14 and the arms 11, first in a clockwise direction (Figs. 1 and 2) and then the reverse, this operation of these parts occurring at all operations of the machine and resulting in an invariable movement of all of the arms 11 for all operations of the machine.

As shown most clearly in Figs. 2 and 4, members 21 are pivoted at 22 to the sides of the arms 5, which members are provided with hooked extensions 23 at their outer ends held normally in front of the rollers 8 by springs 24 connected at one end to lower projecting portions 25 at the rear end of the pivoted members 21 and at the other end pins 2511 on depending projections 26 of the arms 5. With these parts connected and in normal condition any movement of the oscillatory arms 11 will, through the links 9, correspondingly oscillate the arms 5 and the gear segments 2 rigid therewith. The pivoted members 21, however, carry shoulders 27 at such distance from the shaft 3 as to clear the ends of amount keys 4 when none of these are depressed but as to engage the ends of any depressed key of the corresponding bank. Engagement of the shoulder 27 with the depressed key serves to move the pivoted member 21 downwardly about its pivot, and carry its hooked end 23 from in front of roller 8 of the link 9, the occurrence of which thus frees this roller and its link for movement away from the central shaft 3 and further movement of the arm 11, whose movement is constant, causes only the straightening of link 9 and arm 11 as a toggle with no further driving of the arm 5 and its connected segment gear. The pin 2511 extends under the arm 5 and engages the lower edge of the arm when its projection 25 is moved from in front of the roller 8, the arm 5 being positively arrested in this manner by the depressed key and the pin. During the further movement of the arm 11 after the freeing of the roller 8 by the pivoted member 21, it carries the roller outwardly along the underside of projection 6 of the arm 5 and into the corresponding one of grooves 28 properly positioned in the frame for the bank of keys for this purpose. As soon as the roller 8 rides into the adjacent groove 28 it is prevented from further angular movement about the shaft 3 by the upper side of its engaged groove thus precluding any further driving effect of this roller upon the arm 5, yet permitting the continuance of the arm 11 in its oscillation if it has farther to go under the action of the cams 1. Upon return of the arm 11 to normal position it first withdraws the roller 8 from the groove in which it is located into engagement with the notch 7 of the arm 5, when further movement will, by engagement of the roller with the lower side of this notch, restore the arm 5 and its connected segment to normal position.

In this way the key depressed controls the extent of movement to be given to the gear segments 2 by the invariably movable arm 11. A zero groove 28' is provided just beneath the one corresponding to the lower numeral key 4, and the roller 8 will be forced into this groove in case no key of the bank has been depressed. This is accomplished by a pivoted zero stop member 29 pivoted at 30 to the key bank frame and provided with a projection 31 at its upper end normally projecting into the path of the shoulder 27 of the corresponding pivoted member 21. The zero stop member 29 is pivotally connected at 32 (Figs. 2 and 18) with the lower end 33 of a detent plate provided with notches 34 having bevel corners 35 adjacent the keys of the bank. Rollers 36 project laterally from the keys 4 and serve when any key is depressed to engage the corresponding bevel corner 35 of the adjacent notch and slightly raise said plate. This raising of the detent plate through the engagement of its lower end with the pivoted member 29 serves to rock said member about its pivot 30 and carry its upper projection 31 out of the path of shoulder 27. This shoulder, however, in case no key has been depressed to raise the detent plate, will lower the pivoted member 21 when the differential mechanism reaches zero position, as will the end of the depressed key when this projection 31 is cleared by the shoulder 27. As shown in the drawings the zero position of the differential mechanism is not its normal or home position as the arms 5 of the differential mechanism move one step to zero position before they engage their zero stops and the purpose of providing for this extra step of movement from home to zero position will be described later.

The differential movement of the arms 5 and gear segments 2 obtained as above is utilized to set the indicating and printing mechanisms and to control the actuation of the counters. In entering items in the machine the latter are not rocked into engagement with the gear segments or actuators until just prior to their return movement and since the segments will always have one step of movement even when no keys are depressed which movement carries the segments from normal position to zero position, the counters are rocked out of engagement with the actuators as the latter are returned through their zero position, after which rocking out of the counters the additional step of movement of the actuators from zero to normal position takes place. To provide sufficient time for this rocking out of the counters while the actuators are in zero positions a dwell portion 37 in the grooves 20 of the cams 1 is formed just ahead of the final return effecting portion 38 of this groove. It is while the roller 19 is opposite the dwell portion 37 that the counters are rocked out of engagement with their actuators.

*Amount indicating mechanism.*

As stated, the differential mechanism of the gear segments 2 and the arms 5 controls the setting of the amount indicators. Though the number of indicators and corresponding banks of amount keys is not material to this invention the disclosure of this machine shows six banks of amount keys and eight amount indicators. All eight of the indicators are controlled by differential devices such as are hereinbefore described. Six of the differential devices are controlled by the banks of amount keys in item entering, or by the corresponding totalizer elements in total taking, while the remaining two are controlled by the higher order totalizer elements only and are operated only in total taking operations. The two higher order elements are provided simply to receive transfers from the totalizer elements of lower order and no banks of keys are necessary. Differential devices must be provided for the two elements, however, as it is through the differential devices that the totalizer controls the adjustment of the indicators and type carriers to indicate and print the total. A side view of one of the amount indicators is shown at 39 in Fig. 1 and they are all loosely mounted upon a common shaft 40 extending longitudinally through the machine near its top. All of these indicators 39 are numbered on their peripheries from "0" to "9" and rigidly carry at their sides pinions 42 also coaxial with the shaft 40. The pinion 42 of each indicator gears with teeth on corresponding indicator actuating segments 43 all of which are loosely mounted on a shaft 44 and have rearwardly and downwardly projecting portions 45 provided with alining notches 46 on their edge which coöperate with alining pawls 47 which serve to aline adjusted indicators. A series of shafts 48 extending longitudinally of the machine and arranged in a vertical row beneath the indicator segment shaft 44, connect with corresponding amount printing segments to be hereinafter described, and these printing shafts are adapted to be differentially rotated by mechanism, partly in common with the mechanism that rotates with the indicator segments 43 and their connected indicators. To this end each of these shafts rigidly carries an arm 49 projecting rearwardly and from each of the indicator segments 43, depends a link 50. Corresponding printing shaft arms 49 and corresponding indicator segment links 50 connect with each other, and with one end of links 51 pivotally connected at their other end at 52 with corresponding links 53 passing beneath the central shaft 3 of the machine and pivotally connecting at their forward ends at 54 with corresponding ones of the arms 5. When the machine is not in operation and any indicator is in zero position, that is when it indicates zero, the corresponding link 153 is out of engagement with the shaft 3 and the extra step of movement of the arm 5 from normal or home position to zero position is required to raise the link into engagement with the shaft so that the first step of movement of the differential mechanism from its normal to its zero position does not effect the setting of the indicators or the type wheels. Fig. 1 shows the arm 49 for the fifth printing shaft from the top connecting at 55 with the depending link 50 of the indicator segment shown and the upward end of link 51. Differential actuation of the arm 5 and actuator gear 2 shown in Fig. 1 will correspondingly position the printing segment connected with the fifth shaft 48 counting from the top and also correspondingly position the indicator 39 shown in this view. Similar connections between the other printing shaft arms 49 and the corresponding indicator segments 43 with their corresponding differential mechanisms is used.

It will be observed that the links 53 of the indicating and printing mechanisms are connected only to their arms 5 and to their corresponding links 51 and are curved intermediate their ends to fit around the central shaft 3. The indicator and printing segments stand in adjusted position from one operation until the beginning of the next and when these segments and indicators are to be adjusted from a lower to a higher indicating position, the movement of the arms 5 of the differential mechanism is all that is needed to so adjust these members, but in case an indicator element and printing segment are to be adjusted from a higher to a lower position means are necessary for forcing the intermediate portion of such links 53 upwardly against the under surface of the shaft 3, the position of the indicators and the printing segments being determined by the position of the forward ends of the links 53 when their intermediate portions are in engagement with the shaft 3. To cause engagement of these intermediate portions with the under side of this shaft to insure the correct positioning of the indicators and printing segments the rod 14 rigidly carries a corresponding number of arms 56 carrying projections 59 at their ends. The rod 14 can oscillate in its bearings in the arms 15 and near each end rigidly carries a slotted arm 561, the slots of which engage over rollers 58 supported by the adjacent machine frames. The indicators and printing segments are set on the forward movement of the actuators and oscillation of the bar 14 in its forward direction, since it rigidly carries the members 56 and 561, will, through the engagement of the rollers 58 with the slots 57 in the arms 561, cause the rotation of the rod 14 with the members 56 and 561, in a counter-clockwise direction so as to carry the projections 59 on the arms 56 upwardly to engage the intermediate portions of their corresponding links 53, and cause the engagement of this portion at least by the end of the forward movement of the rod 14, with the under side of the central shaft 3. Only in instances in which the indicator and printing segments will be adjusted from higher to lower position are projections 59, however, necessary to move the links 53 into engagement with the shaft 3, and their provision is unnecessary when these segments are to be adjusted from lower to higher positions.

The alining pawls 47 are rigid with a shaft 60 extending longitudinally of the machine, which shaft is rotated slightly in a counter-clockwise direction in Fig. 16 at the very beginning of an operation of the machine by a cam 61 having a groove 62 in its side in which plays a roller 63 mounted intermediate the ends of a link 64 slotted at its lower end at 65, to engage over the drive shaft D which also drives the cam, and pivotally connected at its upper end at 66 to an arm 67 rigid with the shaft 60. At the end of an operation of the machine the cam 61 rotating in a clockwise direction in Fig. 16, roller 63 rides into portion 68 of the cam slot 62 thus pulling down the link 64 and rotating the indicator alining detent shaft 60 in a clockwise direction to engage the detents with the adjusted indicator segments to lock them against displacement. The shaft 60 also rigidly carries forwardly projecting arms 69 carrying pins 70 at their ends. An alining member 71 for the special indicator is notched at 72 at its lower end to engage over and be guided by shaft 60 and in front of this notched portion, is provided with a forwardly projecting portion 73 in which is a slot 74 working over the pin 70 of the arm 69. The upper end of this alining member for the special indicator is bent laterally at 75 for engagement with any of the flattened portions of the periphery of the special transaction indicators. When the alining member 71 is in the position shown in Fig. 16 the bent portion 75 engages a flattened portion of the special indicator and prevents rotation of the latter. Rotation of the shaft 60, however, by the cam 61 to withdraw the detent pawls 47 from engagement with the indicator segments 43 also, since arm 69 carrying pin 70 is rigid with this shaft, and through engagement of this pin with slot 74, draws the special indicator alining member 71 downwardly to permit adjustment of this indicator. Return rotation of shaft 60 to engage the detent pawls 47 with the amount indicator segments 43 also serves to raise the special indicator alining element 71 to lock its corresponding indicator element in set position.

The side of cam 61 opposite to that in which the groove 62 is located is provided with the cam groove 76 in which plays a roller 77 projecting from one side of link 78, the lower end of which is slotted at 79 to engage over and be guided by the drive shaft D. The upper end of this link is pivotally connected at 80 to flash carrying member 81 pivoted for oscillation about the amount indicator shaft 40. This member carries front and rear indicator flashes 82 and 83 respectively which are by the means just described, moved about the axis 40 at the beginning of an operation of the machine to obscure the otherwise exposed indicating characters. The indicators are thus kept in obscured position until at the end of the operation of the machine when the cam groove 76 is effective to return the flashes to normal position and expose the adjusted indicators. A link 85 is connected at its lower end to the amount indicator flash carrying elements 81 and to the upper end of link 78 at 80 and at its upper end at 86 to flash carrying element 87 for the special indicators. The special indicator flash carrying element is mounted to oscillate about the shaft 88 carrying the special set of indicators and carries front and back indicator flashes 89 and 90 respectively. By this mechanism, the cam groove 76 in link 78 serves to expose and obscure the amount and special indicators simultaneously.

*Special or clerk and transaction indicating mechanism.*

The special indicators are mounted about the axis 88 and above the amount indicators and comprise clerks' and transaction indicator elements. Separate banks of keys are provided for controlling the transaction and clerks' indicating elements, the former bank being illustrated in Fig. 5 and the latter in Fig. 11. The differential mechanism controlled by the clerks' and transaction keys is substantially like the amount differential mechanism with the exception that the differential mechanism of the clerks' and of transaction keys do not carry gear segments corresponding to the amount gear segments 2 and is actuated by different cams. The driving arm 11 for this differential mechanism is loosely mounted on the shaft 3 and the recess 13 on the convex edge of the rearwardly projecting extension 12 engages a rod 600 carried by two arms 601 similar to the arms 15 of the amount differential mechanism and loosely mounted on the shaft 3. A similar arm for the turn to zero bank of keys also engages this rod 600. The arms 601 pivotally connect at 602 with links 603 which are provided with recesses at their rear ends which pass over the drive shaft D. The links carry rollers 605 playing in corresponding cam grooves 606 formed on the faces of disks 608 rigidly mounted on the drive shaft D. The shape of the cam grooves 606 are such that the driving arms 601 will be oscillated first counter clockwise before the driving mechanism for the amount banks of keys is operated by cams 1 as explained. The arms are then brought to rest while the differential mechanism for the amount banks is being operated and are finally restored to normal position after the amount differential mechanism has been restored to its normal position. The arm 5 of the transaction differential mechanism as shown in Fig. 5 pivotally connects at 91 with a link 92, the other end of which connects at 93 with a short link 94, the upper end of which is pivotally connected at 95 with an arm 96 rigid with a shaft 97 which is connected to actuate the transaction printing segments. The arm 96 and link 94 also connects at 95 with the lower end of an upwardly extending link 98 connecting at its upper end at 99 with a transaction indicating segment 100 pivotally mounted upon a stationary stud 101. The indicator segment 100 gears with an intermediate pinion 102 which in turn meshes with a pinion 103 rigid with a transaction indicator 104. By the mechanism just described differential movement of the arm 5 controlled by the bank of transaction keys serves to accordingly position the transaction indicator and the transaction printing segment which is operated from the shaft 97.

Just beneath the shaft 97 (Fig. 5) is a shaft 105 which connects at its end to actuate the clerk's printing segment. This shaft rigidly carries an arm 107 which connects at its end with a link similar to link 98, which in turn connects with an indicator segment for the clerk's indicator and with a link corresponding to the link 94 to a link corresponding to link 92 in turn connected with the arm 5 of the clerk's differential mechanism. For the sake of brevity these connections for controlling the clerk's indicator and clerk's printing segment from the clerks' bank of keys are omitted in the drawings but in construction they are substantially identical with the connection between the transaction keys and their corresponding indicator and printer connecting shaft above described.

*Printing mechanism.*

As above stated, the shafts 48 are used to control the positioning of the amount printing segments, the shafts 97 for the transaction printing segment and the shaft 105 the clerk's printing segment. These shafts extend to the right side of the machine and rigidly carry rearwardly projecting arms 108 (Fig. 25) which pivotally connect with corresponding links 109, the lower ends of which are pivotally connected at 110 with the rear end of two-armed members 111 mounted for oscillation about the central shaft 3 of the machine. The forward arms of these levers are pivotally connected at 112 with the lower ends of links 113 pivotally connected at their upper ends at 114 with corresponding printing segments 115 mounted for oscillation about a shaft 116. In this way angular adjustment of the shafts 48, 97 and 105 serves to correspondingly position their corresponding printing segments, and since the positioning of these shafts is controlled from their corresponding banks of keys the printing segments are therefrom controlled.

As before stated, the machine is adapted for printing and issuing checks as well as printing upon record strip and to this end the printing segments 115 carry two sets of printing type 118 and 117 respectively for printing upon the record strip and the check strip. The same information is printed by the machine on the record strip and the check strip. The check strip is indicated by the numeral 119 and referring to Fig. 25 it will be seen that this record strip is fed from a supply roll not shown, down through a guide 120 to an electro 121 and between the latter and a platen roller 122 through another guide 123, between another electro 124 and an opposing platen roller 125, through still another guide 126, past cutting mechanism 127 and out between printing type 117 and an impression taking mechanism 128. This latter mechanism is connected to move toward the printing mechanism along with the check cutting mechanism, this movement of these mechanisms being imparted to them by an arm 129 of the impression taking mechanism which is rigid with an arm 130 and adapted to be oscillated therewith about an axis 131. The arm 130 is pivotally connected with a link 132 (Fig. 24) extending rearwardly and upwardly outside the casing of the machine and carrying a roller 133 adapted to work in the cam groove 134 in one side of the cam 135 mounted on the drive shaft D of the machine. By this mechanism a printed impression is made upon the check strip just about the time of completion of one half of a rotation of the driving shaft D. Simultaneously with this printing of the check strip the check cutting mechanism 127 operates to sever the check from the remainder of the check strip.

The electros 121 and 124 are upon opposite sides of the check strip and by suitable designing may be used for printing any matter thereon which is desired, such as advertising matter. An inking roll 136 coöperates with electro 121 by being held in engagement therewith by a spring controlled pawl 137 and for coöperation with the electro 124 another inking roll 138 is provided held in engagement with its electro by a spring controlled pawl 139. Electro 121 is positively rotated through a pinion 140 thereon meshing with a large gear 141 loosely carried by the central shaft 3 of the machine. This gear 141 through an intermediate pinion 142 meshing with a pinion 143 carried by the electro 124 serves to positively rotate this electro in a feeding direction as well as its opposing roll 125 which also carries a pinion 144 meshing with the electro pinion 143. The large gear 141 loose on shaft 3 meshes with intermediate pinion 1440 supported by the frame of the machine and driven by the drive shaft D by a gear 145 mounted thereon. The portions of the electro 129, which contacts with the record strip for feeding the latter do not extend throughout the circumference of the electro that are cut away throughout a considerable portion of the circumference in such a way that the electro only serves to feed the check strip during the first part of the rotation of the electro, and while the latter continues its complete rotation the record strip remains still while it is being printed upon and the printed check severed. The ratio of the gearing between the shaft D and the electros is such that at each operation of the machine the electros are rotated one complete rotation, but the latter half of this rotation by the provision just described effects no feeding of the check strip. The check feeding and cutting mechanism is common in the art and does not form a part of this invention, so further description of it is deemed unnecessary.

The side of the cam 135 opposite that in which is located cam groove 134 is provided with a cam groove 146 in which is adapted to play a roller 147 carried intermediate the ends of a link 148 one end of which is slotted at 149 to engage over and be guided by the drive shaft D. The other end of this link is pivotally connected at 150 with a member 151 pivoted at 152, which member carries a roller 153 coöperating with ink ribbon feeding mechanism not a part of this invention and not shown. On the shaft 152 is rigidly mounted an alining member 154 normally out of engagement with notches on the printing segments. The shaft 152 and alining member 154 are oscillated slightly first in a counter-clockwise and then in a clock-wise direction.

After the printing segments are adjusted, the alining member 154 is moved by the cam groove 146 into engagement with the notches on the adjusted printing segments to aline the latter, in which condition the alining member remains during the printing impressions, and is then returned to normal position. A guard 1561 is pivoted on the shaft 152 and projects forwardly beneath the printing segments and is yieldingly held downwardly by spring 155 to keep the check strip away from the printing segments except when impressions are taken. This guard is curved and arranged when in normal position to not interfere with the adjustment of the printing segments. It is made to yield in an upward direction from normal position so as to permit the check strip to raise into engagement with the type carriers when impressions are taken.

The printing type of the segments 115 are carried by pivoted bars 157 (Fig. 25) pivoted at 158 to the segments. The bars 157 are provided with curved slots 159, the outer peripheries of which are cut away at 160 near the free ends of these bars, and beneath the zero types. All of the printing segments, except the units of dollars and those below, carry projections 161 which extend toward the type bars of lower order and normally project into the curved slot 159 of the adjacent lower order type bar. When the type segments are in position to print zeros, these projections 161 are located in the slots 159 adjacent their cut away portions 160, in which position of these parts the pivoted type bars are allowed to yield under the impression of their platen so as to prevent printing of zero characters. This does not apply to the type carriers for the cents and dimes segments as neither of these are provided with slots in which work projections of the adjacent type segments because in all operations of the machine, even when the amount of the transaction entered is less than a dime, impressions from both of these segments should be taken, the printing of such amounts necessitating the printing of a cipher in the dimes denomination. It is also necessary always to print the decimal mark at the left of the dimes character of all amounts so to this end the printing segment for the dimes carries small decimal point type at the left of all characters thereon. The type bars for the dimes and cents segments are not pivotally carried by them, but are rigid therewith, so that they are always supported for taking impressions. The type bars above that for printing dimes are connected with each other by projections 162 (Fig. 23) of the higher adjacent ones, engaging beneath shoulders 163 of the lower adjacent ones, by which connection, positive prevention of any of these type bars from yielding serves to prevent the yielding of all of the so connected lower order type bars, but does not prevent yielding of those of higher order. As above stated, when all of these printing segments are in zero printing position the pins 161 of the segments are opposite the cut away portions 160 of the type bars of lower order thus permitting all the type bars that are so connected, that is, all above the dime bar, to yield under printing impressions from the platen. In case any segment has been moved from zero printing position its type bar as well as all those of lower order, should print and the construction provides for this since movement of any segment will carry its pivoted bar with it so that the projection 161 of the segment of next higher order will pass from beneath the cut away portion 160 of slot 159 of this type bar into and beneath the uncut-away portion of the outer wall of this slot so as to support the adjusted type bar against yielding under the force of the printing platen. In the manner above indicated the support of any pivoted bar in this way serves to support all those of lower order which might otherwise yield by means of the projection and shoulder connections 162 and 163. In this way ciphers above the highest denomination of amounts entered in the machine are not printed but all those of lower order than the highest denominational numeral in a number will be. This construction is the same for both the printing type for the record strip and that for the check strip.

The record strip is carried by a frame the end pieces 164 of which frame are pivotally supported at 165. (See Fig. 22.) These end pieces support a record strip supply roll 166 and a record strip receiving roll 167 between which passes the record strip 168 passing around a platen roller 169 and over a supporting plate 170 adapted to support the strip for manual writing thereon. Normally the portion of the strip adapted to be printed on by the next operation of the machine lies over the plate 170 and just beneath an opening 171 (see Figs. 24 and 26) in the upper forward portion of the casing of the machine through which opening a pencil may be inserted for writing by the operator upon the record strip. Upon operating the machine the record strip is first reversely fed back on to the supply roll 166 to such extent as to carry the portion which was in position to be written upon into alinement with the portion of the type carriers in printing position when the record strip carrying frame is swung downwardly (Fig. 22) about its pivot 165 to carry the record strip into engagement with the printing type to take an impression. After the printing impression is taken the record strip is fed back in a forward direction and to an extent slightly greater than its reverse feed, thus providing for the general feed of the paper in a forward direction. The record strip frame is swung in a counter-clockwise direction (Fig. 22) about its pivot 165 to carry the record strip against the type carriers to take an impression therefrom by means of a cam 172 having in its side a cam groove 173 in which plays a roller 174 intermediate the ends of a link 175 slotted at one end at 176 to engage over and be guided by the drive shaft D of the machine. The other end of this link 175 pivotally connects at 177 with a plate 178 mounted for oscillation about the shaft 44. The plate 178 is provided with a slot 180 eccentric with the pivot 44 of this plate for the greater portion of its length. By this construction about the time the main drive shaft of the machine is completing one-half of a rotation the link 175 for the record strip carrying frame is operated to carry the record strip into engagement with the printing type to take an impression after which it is again by these connections swung back about its pivot to normal position. After this the forward feeding of the record strip takes place.

For the sake of clearness a showing of the ink ribbon is omitted from the drawings except in Fig. 23. This figure, however, shows the ink ribbon arrangement, the ribbon being indicated by reference character 182 and its two ends being respectively connected with ink ribbon rolls 183 and 184, the ribbon passing from the latter roll beneath roller 185, over roller 186, over large roller 187 loose on one end of printing segment shaft 116, around idle roller 188, beneath the printing type for the check strip, around roller 189, up over a second large roller 190 on the opposite end of the shaft supporting the printing segments, around small roller 191, longitudinally back over and adjacent the printing type for the record strip and over small roller 192 to the roll 183. The arrangement of the inking ribbon and its feeding and reversing mechanism does not constitute a part of this invention and for the sake of brevity further description of this mechanism is omitted.

As hereinbefore stated this invention embodies a novel and peculiar feed for the record strip which provides for manual writing thereon at each operation in substantial alinement with the printing to be done thereon by the machine. The record strip is normally in such position that the portion of it adapted to be printed on at the next operation of the machine is beneath the opening in the casing and over a plate arranged to support it at the place to be written upon by the operator before the beginning of the operation of the machine. The novel feeding mechanism for the record strip of this invention is adapted to reversely feed the record strip at the beginning of the operation of the machine to carry the portion of it normally in alinement with the opening in the casing, into a position for receiving printing record strip impressions from the printing type. Impression is then taken and the feeding mechanism feeds the record strip back toward normal position and beyond its original position one step to position it for the next operation of the machine. This novel feed for the record strip is accomplished by the following mechanism.

Both of the rolls 167 and 166 carried by the record strip frame are provided at one of their ends with feeding disks 193 and 194 (Fig. 21) respectively provided with ratchet teeth and loosely mounted on the projecting ends of these rolls are oscillatory pawl carrying arms 195 and 196, the former mounted for oscillation about the axis of the receiving roll 167 and the latter about that of the supply roll 166. The arm 195 for the receiving roll is provided with a radial slot 197 and with a depending projection 198. Pivoted at 199 to this depending projection is the feeding pawl 200 for the receiving roll having a projecting tooth 201 for coöperating with the teeth on the ratchet disk 193 for feeding the latter and the feeding roll. The spring 202 connects at 203 with the lower portion of a depending projection and at 204 with the end of the feeding pawl opposite that engaging the ratchet wheel, which spring normally tends to engage the tooth 201 of the pawl with the ratchet disk 193. This feeding pawl for the receiving roll is normally prevented from engagement with its ratchet disk under the tension of spring 202 by engagement of the concave portion of a curved member 205 with the end of the pawl opposite that for engaging the ratchet disk which thus holds the opposite end of this pawl out of engagement with the disk 193. The curved member 205 is carried by the upper end of a sliding bar 206 which carries curved fingers 207 and 208 which respectively engage over the projecting ends of the feeding roll 167 and the supply roll 166, which projecting ends thus serve to support and guide this bar for longitudinal movement. The lower end of this bar also carries a curved member 209, curved in the opposite direction however, the concave interior inside portion of which is adapted to coöperate with one end of a pawl 2091 which is pivoted at 210 to the lower portion of the pawl carrying arm 196 for the supply roll. The opposite end of this pawl carries a feeding tooth similar to that on the pawl 200 for the feeding roll, which tooth is normally held just out of engagement with the ratchet disk 194 of the feeding roll by spring 211 connecting the opposite end of this pawl with the lower extremity of the pawl carrying arm 196. When the bar 206 carrying the curved members 209 and 205 is in a lower position than normal spring 211 for the pawl 2091 holds this pawl in operative relationship with its disk 194. Upon raising of the bar 206 with its curved members 205 and 209 the latter acts upon the lower end of pawl 2091 to raise this end and lower the other from engagement with its ratchet disk. Simultaneously with this disengagement of the pawl and disk for the supply roll the pawl and disk for the feeding roll are operatively engaged. The bar 206 stands normally in intermediate position but upon the beginning of an operation of the machine it is shifted downwardly by means of a bell crank 212 mounted for oscillation about the shaft 44 which bell crank connects by a slot 214 at one of its ends with a pin 215 extending laterally from the bar 206. The opposite arm of this bell crank lever 212 is provided with a rectangular projection 216, which in the normal condition of the machine rests upon the upper edge of a plate 217 carried by the oscillatory member 218 mounted for oscillation about a shaft 219 under the influence of a cam 220 carried by the main drive shaft. This cam 220 is provided in one of its sides with a cam groove 221 in which plays a roller 222 projecting from the side of a link 223 the lower end of which is notched at 224 to engage over and be guided by the drive shaft. The upper end of this link is pivotally connected at 225 with one arm of the oscillatory member 218. In this way the member 218 is oscillated first forwardly and then back at each operation. The forward portion of the oscillatory member 218 rigidly carries a member 226 pointed at its upper and lower ends. This member serves upon the forward oscillation of the member 218 to engage the upper rear side of the rectangular member 216 on the rear arm of bell crank 212 and cam its rear arm forwardly, thus rocking the bell crank in a counter-clockwise direction about its shaft 44 and thus lowering its counter clockwise arm and its connected bar 206 is effected. After this forward rocking of the bell crank and the lowering of bar 206 the projection 216 engages the outer surface of the member 226 as the latter is moved down under it by the oscillatory member 218, during which time the record strip is reversely fed into printing position and near the end of this rearward stroke of the member 218, the record strip is printed upon by the printing mechanism. At the completion of the forward stroke of the member 218, the projection 216 of the bell crank 212 compelled by plate 2171 carried by the member 218 and similar to plate 217 adjacent the opposite end of the member 226 rides over the upper point of this member 226 so that return rearward movement of the latter by engaging the lower forward corner of projection 216 completes the rearward movement of the latter started by plate 2171, and consequent rearward rocking of bell crank 212. In the further return movement of the oscillatory member 218, the under surface of the member 226 carried by the oscillatory member rides over the projection 216 back to the normal position shown in Fig. 21, in which the plate 217 has rocked the bell crank 212 slightly forward again to carry the bar 206 back into its intermediate position. During the forward movement of the oscillatory member 218, the bar 206 is in lowered position and the feeding of the record strip back on to the supply roll takes place, while on the return movement of the oscillatory member 218 the bar 206 is in raised position, in which the lower pawl 209 is disengaged from its ratchet disk, and the upper pawl 200 engaged with the upper ratchet disk, during which time this particular pawl effects forward feeding movement of the feeding roll 167. By-pass pawls 227 and 228 are carried at the ends of member 226 which are spring controlled, and the pawls serve to prevent relative movement of the projection 216 around the member 226, except in the clockwise direction as above outlined.

The oscillatory member 218 also serves to actuate the feeding mechanism for the record strip. Two links 229 and 230 are pivotally connected to the oscillatory member 218, the latter being connected at a point farther from the axis 219 of this member than is the point of connection of the link 229. In this way, the extents of movements of the links by the common oscillatory actuating member 218 are different, the upper one or that one operating feeding mechanism for the receiving roll being given a greater movement at each operation so as to provide a feed in a forward direction slightly greater than the reverse feed under the control of the supply roll. The pawl carrying frame 196 for the supply roll is provided in its end opposite the pawl with a radial slot 231, and into this slot projects a pin 232 carried by the link 229. The frame 195 is also provided with a radial slot 197 above the pawl 200, and a pin 233 on the forward end of the link 230 coöperates with it for rotating the frame. These pins project from both sides of the links on one side through the slots 231 and 197, and from the other sides so as to rest upon the record strips wound around their respective rolls. The amount of record material on the rolls thus determines the distances from their axis at which their corresponding links connect with their pawl carrying frame. The extent of longitudinal movements of either of the links 229 and 230 is the same for all operations of the machine, but when there is but little record material on the roll which one of the links feeds its pin 232 or 233 as the case may be, lies near the axis of the roll, and when the link is moved longitudinally by the oscillatory member 218, the roll will be fed through a greater angular distance than when the diameter of the paper on the roll is greater and its pin and link acts upon the pawl carrying frame at a point greater in distance from its axis. The same mode of operation applies to the feeding mechanisms of both rolls and these mechanisms, thus provide for keeping the feed of the paper substantially the same, regardless of the diameter of the rolls.

When the bar 206 is in lowered position, pawl 200 is held disengaged from its ratchet disk 193, and pawl 209 is allowed to engage its disk. In this condition of the parts the links 229 and 230 are moved forwardly, causing counter-clockwise movement of both the pawl carrying frames as shown in Fig. 21. This movement effects rotation of the lower supply roll in the same direction but the upper pawl 200 for the feeding roll being disengaged from its disk, does not rotate the latter in this direction, but permits, however, such rotation under the pull of the record strip in a reverse direction caused by the reverse rotation of the supply roll. After the record strip is thus reversely fed onto the supply roll, the printing impression is taken. As the oscillatory member 218 starts its backward or clockwise movement (Fig. 21) bar 206 with its frames 205 and 209 is lifted to disengage the lower pawl from its ratchet disk 194 and to free the upper pawl 200 to permit the spring of the latter to engage it with its ratchet disk 193. Further reverse rotation of the oscillatory member 218 pulls the links 229 and 230 back to their normal position, drawing with them their connected pawl carrying frames. During this reserve rotation, in which the pawl carrying frame for the receiving roll 167 is connected with its disk 193, this roll is fed in a forward direction and since the other pawl carrying frame is disengaged from its roll, the supply roll is free to yield and permit the feeding movement of the receiving roll 167. This effective feeding stroke of the link 230 being longer than the feeding stroke of the link 229 due to the different distances of the points of connection of these links from the axis of the oscillatory member 218, a forward feed of the receiving roll 167 is provided which is greater than the reverse rotation of the receiving roll under the pull of the supply roll 166. This additional forward feeding of the roll 167 positions the paper one step in advance preparatory for the next operation of the machine.

*The counters.*

In the particular machine disclosed herein, twenty-seven different counters are provided, though the number is not of the essence of this invention. These are arranged into three groups of nine each. The set of gear segments 2 is a common set of actuators for all of these counters. The denominational elements of all the counters of any one set are grouped together, and the set of counters as a whole is adapted to be shifted longitudinally to bring the elements of any totalizer into operative alinement with the common actuators. The arrangement of these counters is shown in Fig. 14 in which, of the rear set of totalizers one is assigned to each clerk for accumulating all the cash sales made by that particular clerk. Of the forward set of totalizers, one is assigned to each clerk for accumulating that individual's "received on account" transactions. The intermediate set of totalizers is provided for separately accumulating the amounts of the different classes of transactions.

The outer sets of totalizers, that is the clerks' individual cash and clerks' individual "received on account" sets are mounted respectively on shafts 234 and 235 carried respectively by opposing inwardly projecting arms 236 and 237 supported by a frame composed of end pieces 238 and side pieces 239, longitudinal shifting of which frame on shafts 2381 and 2382 which pass through openings in the end pieces and near the opposite sides of the frame serves to correspondingly shift with respect to the actuators both the clerks' individual cash and clerks' individual received on account sets of totalizers. The shafts 234 and 235 are not journaled in the opposing arms 236 and 237 directly, but are supported by vertical slides 240 and 241 which respectively support these shafts (see also Figs. 10 and 11). These slides work in corresponding vertical opposing grooves in the arms 236 and 237, and besides carrying their corresponding one of the totalizer supporting shafts 234 and 235, also carry stub shafts 242, one of which projects from each of the slides longitudinally of the machine and away from the totalizers. Between each of the pairs of slides 240 and 241, also extends a shaft 243 which moves vertically with its slides, and serves to carry the totalizer transfer mechanism up with a totalizer, when the latter is moved into engagement with the actuators. The stub shafts 242 are used in counter selecting operations to be hereinafter described.

The inwardly extending ends of the arms 237 and 236 are slidably supported on shafts 244 and 245, which shafts also carry between the arms 236 and 237 a frame comprising end pieces 246 and side pieces 247. The end pieces 246 have opposing vertical guide ways 248 in which are adapted to slide vertical end pieces 249. In these end pieces 249 is journaled a shaft 250 which carries the transaction set of totalizers. The end pieces 249 also carry stub shafts 251 and a shaft 252 with functions similar to those of the shafts 242 and 243 of the individual clerks' "cash" and individual clerks' "received on account" totalizer frames. Between the end pieces 246 of the frame for the transaction set of totalizers is a transverse connection 253 connecting the side pieces 247 of this frame. The frame which carries both the outer sets of totalizer wheels has its side pieces 239 connected by the transverse pieces 238 so that these two sets of totalizers will shift longitudinally of the machine together. The intermediate set of totalizer wheels or the special transaction set is carried by the separate frame described which can slide longitudinally of the machine on the shafts 244 and 245 independently of the two outer sets of totalizers.

The two outer sets of totalizer wheels or the clerks' individual cash and clerks' individual received on account sets of the machine together are adapted to be so adjusted from the bank of clerks' initial keys. To this end the clerks' keys shown in Fig. 11 are provided with pins 254 which coöperate with inclined slots 255 in a detent plate 256 pivotally connected at its upper end by a link 257 to pivot 258 and at its lower end at 259 with a plate 260 pivoted at 261. The drawings show nine clerks' keys and a corresponding number of inclined slots in the detent plate 256. The four lower slots are inclines inwardly and upwardly, with differential inclinations, however, so that depression of these keys will lower the detent plate and to different extents. The five upper slots are differentially inclined but in the opposite direction whereby depression of these keys serves to raise the detent plate and to different extents. The plate 260 is pivotally connected at 262 with one end of a link 263 the opposite end of which is provided with a roller 264 working in notch 265 formed between members 266 and 267 loosely pivoted about shaft 268. A stationary pin 269 is located between these pivoted members 266 and 267 and serves to limit their movements in one of their directions. A spring 270 is connected at its ends to the members 266 and 267 so as to normally hold these members against stationary pin 269 and by this arrangement this spring serves to return the link 263 and its detent plate 256 for the clerks' keys to normal intermediate position when out of such position regardless of the direction in which the link 263 must be moved. The link 263 also connects at 271 with an arm 272 rigid with shaft 273 and another arm 274 rigid on this shaft pivotally connects at 275 with one end of the link 276, the opposite end of which connects at 277 with an arm 278 rigid with shaft 279. In this way the shafts 273 and 279 are simultaneously and correspondingly rotated by the depression of the clerks' keys. Shaft 273 carries a barrel cam 2740 and shaft 279 carries a similar one 2750 which cams are provided on their peripheries with inclined slots 280, into which project pins 281 depending from inwardly projecting and opposing members 282 and 283 carried by the side pieces 239 of the large clerk's individual totalizer frame. By this means the clerks' keys serve to simultaneously longitudinally adjust the outermost sets of totalizers so as to bring the elements of the corresponding totalizers of these sets into operative alinement with the set of actuators. The set of actuators normally aline with the open spaces between totalizer elements of two adjacent totalizers or between the elements of the 4th and 5th totalizers as shown in Fig. 14, counting from the left. Consequently to aline the four left hand totalizers of this figure which correspond to the four lower keys of Fig. 11, the totalizers must be shifted to the right in Fig. 14, while if it is desired to actuate any of the other five totalizers, the groups must be shifted to the left in this figure, which is done by depression of the corresponding one of the five upper keys in Fig. 11.

The intermediate or transaction set of totalizers is shifted longitudinally of the machine in a similar way, but under the control of a detent plate co-acting with the set of transaction keys. The shift-cam 284 for the transaction set of totalizers is rigidly carried by the shaft 268, which shaft near one end rigidly carries an arm 285 connecting at 286 with one end of a link 287, the opposite end of which connects with an arm not shown loosely carried by shaft 273, which arm is rigid with another arm pivotally connecting with a link connected with the detent plate of the transaction keys similar to the connection of the link 263 with its detent plate. As this construction is substantially like that which connects the clerk's key detent plate with its link 253, it has been omitted from the drawings. The link connecting with the detent plate for the set of transaction keys, connects at its lower end with a set of members corresponding to 266 and 267 for the link 263, which serve to retain and normally restore their detent plate and cam 284 to intermediate position. The above described constructions indicate the means for longitudinally shifting the sets of totalizer wheels laterally with respect to their common actuators for the purpose of alining the desired ones with the actuators for actuation. This shifting of them, however, does not serve to engage the desired totalizer with the actuators, but this engagement requires an additional movement of those totalizers to be engaged with the actuators, toward the actuators, which is accomplished by mechanism which will now be described.

The counters after being alined with the actuators by the clerks' and transaction keys as above described, are adapted to be brought into operative engagement with the actuators by the upward sliding of the end pieces 240, 241 and 249 which respectively carry the shafts supporting the clerk's individual "cash," the clerk's individual "received on account" and the "transaction" sets of totalizers. The work of upwardly shifting the sets of totalizers is accomplished from the operation of the machine proper, but the transaction keys serve to control the selection of the sets of counters to be moved toward the actuators. To this end, referring to Fig. 5, the differential mechanism for the transaction bank of keys, which is driven by the cams 608 and is similar to the differential mechanism of the amount bank, aside from the omission of gear segment 2, also carries a rearwardly projecting arm 287 rigid with the arm 5 of this differential mechanism and having movement always corresponding therewith. This arm 287 carries at its end a laterally projecting pin 288 which works in a slot 289 of an upper enlarged portion 290 of a totalizer selecting bar 291. This latter bar has a slot 292 through which passes a shaft 293 which serves to guide the bar 291 in its longitudinal movement. The opposite end of the bar 291 has a slot 2931 through which passes a stationary shaft 294 which serves to guide the lower end of this bar. Two other curved bars 295, one just outside of and near each end of the totalizer frames, and one of which is shown in Fig. 5, have slots 296 in which is located the shaft 293 and notches 297 at their opposite ends through which pass the stationary shafts 298 and 2382. These bars 295 have at their rear ends forwardly projecting portions 299 having slots 300 into which project pins 301 carried by arms 302 rigid with shaft 293. This shaft 293 rigidly carries an arm 303 (Fig. 6), to which is pivotally connected at 304 a link 305 curved at 306 to clear the drive shaft D, and pivotally connected at its upper end at 307 with one of these arms 308 loose on shaft 309. There are two of these arms, and a rod 310 connecting the outer ends of these arms normally, when items are entered in the machine, plays in a notched portion 311 of an opening 312 in the upper end of a plate 313 provided with a slotted portion 314 working over and adapted to be guided by the drive shaft D. The plate 313 also has a transverse slot 315 through which, and into cam groove 316 (Fig. 9) in one side of a cam 317 used in adding or item entering operations, extends a pin 318 carried by an arm 319 on shaft 320. The shape of the cam groove 316 is such that the plate 313 will start to be lowered at substantially one-half of a complete rotation of drive shaft D and will be held in a lowered position while the shaft passes over a substantial portion of its remaining angular movement and will be then raised to normal position when the arms 5 of the differential mechanism reach zero position and while the roller 19 on the pitman 18 is playing in the dwell 37 of its cam groove 20 and the plate remains in normal position until the completion of the operation while the arms 5 are being moved by the cam 20 from their zero to their normal position. This lowering and raising of the plate 313 through the pin 310 and notch 311 correspondingly oscillates the arm 308 which being connected by pin 307 to the link 305 first lowers and later raises this link. The link 305 through the connection of its lower end with arm 303 rigid with shaft 293 connected by arms 302, one at each end of the totalizers, with the curved bars 295 guided by shafts 293 and 298. causes the forward shifting of these latter bars at about the completion of one-half the rotation of the drive shaft. The bars are held in forward position the length of time the plate 313 is in its lowered position and are then returned rearwardly with the upward raising of the plate 313.

This forward shifting of the bars 295 before actuation of the amount differential mechanism effects upward lifting of the sets of totalizers selected by the positioning of bar 291, which is at the left end of the totalizers as controlled by the depression of the transaction key. To this end the bar 295 has pivotally connected to it at 321 and to upward projections 322 and 323 at 324 and 325 respectively, arms 326, 327 and 328 carrying laterally projecting rollers 329 at their free ends, and having slots 3921 intermediate their ends. The stub shafts 242 and 251 projecting outwardly from the end pieces 240, 241 and 249 for the sets of totalizer frames project through these slots and from the shape of the latter as shown in Fig. 5, it will be seen that when these arms 326, 327 and 328 are supported at their free ends that the forward shifting of the bars 295 will, through these inclined slots 3921, serve to lift the sets of totalizers to bring the alined totalizer of each set into engagement with the actuators. Supporting pawls 330 are mounted on shafts 245, 244 and 2382, one at each end of the shafts, and are rigid with arms 332 at one end of the shafts. Springs 333 (Fig. 6), three in number, connecting at one end with corresponding ones of the arms 332, the two left-hand ones connecting at their other ends with the adjacent right-hand shafts 244 and 2382, and the remaining spring at its other end to the shaft 293, tend to hold all of the shafts in such position that their pawls 330 are against and under the pins 329 of the arms 326, 327 and 328 so as to support these arms so that forward shifting of the curved bars 295 through the inclined slots in them will raise the totalizers into engagement with the actuators.

The counter selecting bar 291 is provided on its under side with cut away portions 334 and 335 intermediate its ends, and a cut away portion 336 at its forward end. Normally this bar stands in the position in which it is shown in Fig. 5 with projecting portions 337 and 338 engaging over pins 339 projecting from the plates 332 for the clerks' individual "received on account" and "transaction" sets of totalizers. A laterally projecting pin 339 on the plates 332 for the clerk's individual "cash" set of totalizers not being in engagement with the bar 291, so that the pawls 330, rigid with these plates are under the tension of foremost spring 333 held in upward position to support the pins 329 of adjacent arms 326, and if the curved bar 295 were shifted forward when the parts were in the position shown in Fig. 5, the forward or clerk's individual "cash" set of totalizers would be the only one raised to engage its alined totalizer with the actuators. The pawls 330 for the transaction and clerks' individual "received on account" sets of totalizers will in such an operation be retained in lower position against the tension of their springs by engagement of the projecting portions 337 and 338 of the bar 291 over the pins 339 of their corresponding arms 332.

It is necessary to operate one of the transaction keys, however, in entering items in a machine, and these keys are provided for differential shifting of the bar 291. To this end, the enlarged portion 290 of the bar 291 pivotally carries at 340, a plate 341 provided with a slot 342, the upper portion 343 of which is at an angle to the lower portion. In this slot is adapted to work a stationary pin 344 supported from the frame of the machine, and the upper forward portion of the plate has a projecting portion 345 extending forwardly into the plane of the slot 289 in the enlarged portion 290 of the member 291. When the parts are in the position shown in Fig. 5, the stationary pin 344 through the lower portion of the slot 342 in the plate 341, holds the forwardly projecting portion 345 of the plate beneath the pin 288 of the arm 287 of the transaction differential mechanism. With the parts in this position downward movement of the arm 287 will cause downward movement of the bar 291 since the projecting portion 345 of the plate 341 precludes movement of the pin 288 in the slot 289. This downward movement of the bar 291 will accompany the downward movement of the arm 287 until the angular portion 345 of the slot 342 rides over the pin 344 so as to cause swinging of the plate 341 rearwardly about its pivot 340 to move the forwardly projecting portion 345 of this plate from underneath the pin 288. After this is done movement of the pin 288 in slot 289 is possible, and further movement of the arm 287 will continue independent of the bar 291. Even were no transaction keys depressed the bar 291 would be lowered one step as two steps of movement of the differential arm 5 of the transaction differential mechanism takes place before this arm is stopped by the depression of the lowermost transaction key.

The transaction keys beginning at the bottom of Fig. 5 may be denominated respectively, "Cash", "Received on account", "Paid out", "Charge", "Checks drawn", "Bills paid", "C. O. D.", "Billsdisc." and "Bank deposits". The depression of the lowest or "cash" key allows the differential mechanism to move two steps and the bar 291 a similar distance. With the "received on account" key depressed movement of the bar 291 three steps results. The keys above the "received on account" keys cause no further shifting of the bar 291 than does the "received on account" key since the differential mechanism in moving to the fourth position or beyond, carries the bar 291 sufficiently downward to engage the pin 344 with the inclined portion 343 of the plate 341, to disengage the forwardly projecting portion 345 of this plate from the pin 288, thus freeing the pin and the arm 287 so that their further movement does not effect any further shifting of the bar 291.

From an inspection of Fig. 5, it will be seen that downward shifting of the bar 291 two steps, to which extent it would be shifted when the "cash" key is depressed, would not move this bar sufficiently to engage the forward part of the projecting portion 337 of the bar over the pin 339 of the plate 332 for the clerk's individual "cash" set of totalizers. This set then with the machine operated with the "cash" key depressed is shifted upwardly by forward movement of the bar 295, to engage the alined totalizer of this set with the actuators. The shifting of the bar 291 forwardly two steps under depression of the "cash" key, however, carries the recess 334 in the underside of the bar 291 over the pin 339 of the normally depressed plate 332 for the transaction set of totalizers, thus freeing this plate and allowing the corresponding spring 333 to rock it and the shaft to carry the latter pawls 330 upwardly to engage beneath and support the pins 329 carried by the free ends of the arm 327, thus permitting when the machine is operated with the "cash" key depressed, not only the clerk's individual "cash" set of totalizers but also the set of transaction totalizers to be raised into engagement with the actuators. The raising of these two sets of totalizers at such operations is desirable because the forward or clerk's individual "cash" set has separate totalizers for the individual clerks, but one of the totalizers of the intermediate or transaction set of totalizers is for accumulating the total of all cash transactions, so this totalizer of the transaction set should be rocked in whenever "cash" transactions are handled by the machine. This forward shifting of the bar 291 two steps controlled by depression of the "cash" key will not be sufficient to cause the portion 338 of the under side of the bar 291 to clear the pin 339 of the plate 332 for the clerk's individual "received on account" set of totalizers, so the pawls 330 for this set will be held downwardly and from engagement with pins 329 of the arms 328 which thus have no support at their free ends, and forward movement of this arm by the bar 295 will not effect the lifting of the clerk's individual "received on account" set of totalizers.

The depression of the "received on account" key permits the differential mechanism for the transaction bank to move three steps, which, when the machine is operated cams the bar 291 forwardly three steps.

From an inspection of Fig. 5, this will be seen to carry this bar forward sufficiently to engage the forward end of the projecting portion 337 of the bar, over the pin 339 of the plate 332 for the clerk's individual "cash" set of totalizers. This movement at the same time carries the recess 334 above the pin 339 of the plate 332 for the transaction set of totalizers, and the rear recess 335 above the pin 339 of the plate 332 for the rear or clerk's individual "received on account" set of totalizers. Thus when a "received on account" key is depressed and the machine operated, the forward or clerk's individual "cash" set will not be raised into engagement with the actuators but the two remaining or "transaction" and clerks' individual "received on account" sets will be raised for actuation by the actuators.

Depression of the third key from the bottom (Fig. 5) or any other above this key, shifts the bar 291 forwardly four steps, and positions the projecting portion 337 over the pin 339 of the plates 332 of the forward or clerk's individual "cash" set of totalizers, and positions the projecting portion of the bar 291 at the rear of the recess 335 over the pin 339 of the plates 332 for the clerk's individual received on account set of totalizers thus holding, when the machine is operated, when any key above "received on account" is depressed the clerks' individual "cash" and clerks' individual "received on account" totalizers from being shifted into engagement with their actuators. This shifting of the bar four steps, however, positions the rear portion of the recess 334 over the pin 339 of the plate 332 for the transaction set of totalizers so that an operation of the machine with the "paid out" key, or any of the seven upper keys (Fig. 5) depressed permits only the raising of the transaction set of totalizers to bring the alined one of their set into engagement with the actuators. Since clerks' individual totalizers are only provided for cash and received on account transactions, depressions of all other transactions keys are effective to engage only the transaction set of totalizers with the actuators. The machine contains separate totalizers for the clerks for their "cash" and for their "received on account" transactions in which they receive money and separate totalizers for accumulating grand totals of amounts of the nine different classes of transactions.

*Reading and resetting.*

The reading and resetting of all of the totalizers of the machine may be accomplished by operations of it. Since depression of some of the transaction keys simultaneously brings into mesh with the actuators two totalizers, provision is necessary whereby upon the depression of such transaction keys, in turn to zero operations more than one totalizer is prevented from being engaged with the actuators at a time, since in total printing or turn to zero operations in which the movement of the differential mechanism is controlled by the return to zero of the elements of a totalizer, it is obvious that but one totalizer can be engaged with the actuators in such operations at a time.

In ordinary item entering operations as above described, the curved bar 295 is shifted by means of the adding cam 317, and the time of shifting of this bar 295 is such that the selected totalizers are brought into engagement with their actuators on their return stroke. To provide for reading and for resetting operations, the former of which leaves the totalizers at their original position and the latter leaves them at zero, two other cams are provided which determine the time of shifting of the bar 295. These are necessary for the reason that in resetting or turn to zero operations in which the totalizers are left at zero, the totalizers should be brought into mesh with the actuators previous to their forward movement and then disengaged, the actuators returning to their original position leaving the totalizer wheels at zero, while if a reading of a totalizer only is desired and no leaving of it at zero, the totalizer should be engaged with the actuators previous to their forward movement and retained engaged therewith through the return movement of the actuators, which return movement serves to restore the totalizer to its original position. For the two additional cams referred to plates corresponding to plate 313 for the adding cam are provided, which are connected to control the shifting of the bar 295, for reading, and resetting operations. Fig. 7 shows the cam and plate for controlling the shifting of the bar 295 in reading operations in which the totalizers are left at their original position, while Fig. 8 shows the cam and plate designed for engaging the totalizers with the actuators on their forward stroke only, thus leaving the totalizer at zero at the end of the operation. Fig. 9 shows the normally operative item entering cam with its connections above described.

The arm 308 has the connections above described for shifting the bar 295 and this arm is oscillated in not only adding but reading, as well as resetting operations so the timing of oscillation of this arm 308 corresponds with the timing of the shifting of the bar 295. The rod 310 of the arm 308 extends in one direction through an opening 312 in the plate 313 for the adding cam and in the other direction through an opening 346 in the plate 347 for the reading cam, through an opening 348 of plate 349 of the resetting cam. The reading cam which is designed to restore the totalizers to their original position is designated by reference character 350, while the resetting cam which leaves the totalizer at zero is designated by 351. The plates 347, 349 and 313, are provided respectively with notches 352, 353 and 314 which are adapted to engage over and be guided by the drive shaft D of the machine, and these plates are adapted to be lowered and raised by their corresponding cam grooves 354 and 355 and 316 by pins 356 and 357 and 318, working in them carried by arms 358 and 359 and 319 loosely supported by the shaft 320, which pins 356 and 357 and 319 also work through transverse slots 360 and 361 and 315 in their corresponding plates. In this way the plates are raised and lowered at times determined by the contour of the slots in their operating cams and this lowering and raising of all of the plates is the same in all operations of the machine.

In normal or item entering operations, the lowering and raising of the reading plate 347 and the resetting plate 349 does not serve to raise the arm 308 on the shaft 309 because when the machine is in normal condition for item entering operations, the relationship of the rod 310 to the openings 346 and 348 in these plates is as shown in Figs. 7, 8 and 9, which permits lowering and raising of the plates 347 and 349 without engaging the rod 310 with the ends of these openings to oscillate the arm 308. In this normal position, however, the rod 310 is located in the notch 311 at one side of the opening 312 in the plate 313 of the item entering cam and with these plates in their normal position for entering items shown in Figs. 7, 8 and 9, the arm 308 will be lowered and raised at times determined by the contour of the cam groove 316 in the item entering cam 317.

The lower ends of all of the plates 313, 347 and 349 are slotted at 362 in which slots works a pin 363 carried by a plate 364 (Fig. 6) pivotally mounted upon the drive shaft D. This plate on its forwardly and downwardly projecting portion is provided with a slot 365 in which plays a pin 366 projecting from the side of a rearwardly extending arm 367 rigid with the arm 5 of the differential mechanism for the turn to zero bank of keys. By this construction positioning of the arm 367 to different extents serves to forwardly oscillate the lower portion of the plate 364 to corresponding extents. This forward swinging of the plate 364 through its pin 363 serves to forwardly swing the lower ends of the plates 313, 347 and 349 and to accordingly rearwardly swing their upper ends.

The differential mechanism for the turn to zero or read or reset bank of keys is shown in Fig. 6. This mechanism is adapted in all operations of the machine, even when no turn to zero keys are depressed, to have three steps of movement imparted to it. These first three steps of movement of the arm 367 do not, due to the shape of the upper portion 368 of the slot 365, effect any oscillation of the plate 364 about its drive shaft D, or sufficient oscillation of this plate to throw the upper ends of the plates 313, 347 and 349 sufficiently rearward to disengage the rod 310 from the notch 311 in the plate 313 and to engage this rod 310 in the narrow portion 369 of the opening 348 of the reset plate 349. Four steps of movement of the differential mechanism, however, which results from depression of the lower turn to zero key, causes sufficient swinging of the plate 364 and the plates 313, 347 and 349 to cause this disengagement and the positioning of the rod 310 in the narrow portion 369 of the opening 348 in the plate 349. After these plates are so positioned rotation of cam 351 will cause the downward oscillation of the arm 308 about the shaft 309 and forward movement of the curved bar 295 to engage the selected totalizer with the actuators upon the forward movement of the latter. This cam disengages the totalizer from the actuators before their return movement thus leaving the totalizer at zero. In such operation the rod 310 being in a larger portion of the openings in the plates 347 and 313, the rotation of the cams and reciprocation of the plates corresponding to these plates has no effect upon the oscillation of the arm 308. The portion 370 of the slot 365 is, when this portion of the slot coöperates with the pin 366, substantially concentric with the central shaft 3 of the machine and is of such length that the depression of either of the three lower read or reset keys effects the same extent of swinging of the plate 364 and its connected plates 313, 347 and 349.

Depression of any of the three upper keys which control the reading operation of the machine in which the counter totalizer are read and restored to original position through a portion 371 of the irregular slot 365, cause the plate 364 to be swung an additional angular distance in a clockwise direction so as to engage notched portion 372 in the side of the opening 346 of the plate 347 over the rod 310 and carry the narrow portion 369 of the opening 348 in the plate 349 out of alinement with this rod. With the machine operated with any of these three upper keys depressed the reading cam 350 will control the shifting of the bar 295 and in such way as to shift it forwardly to engage the totalizers with the actuators for the forward movement of the latter and retain them in engagement during the return stroke, thus providing for leaving the totalizers in their original position.

The keys of the read or reset bank are also adapted through combinations with those of the transaction bank to select the proper totalizer for reading or resetting. The transaction bank of totalizers would do this itself if it were not for the fact that in some operations it provides for throwing more than one totalizer into mesh with the actuators at a time. The turn to zero bank of keys for this purpose is provided with a counter selecting bar 3720, having an enlarged portion 373 at its upper end slotted at 374 to engage over and be guided by the shaft 293. The enlarged portion 373 of this selecting bar also has a slot 375 in which plays a pin 376 carried by the end of the rearwardly extending arm 367 rigid with the arm 5 of the turn to zero differential mechanism. The length of the slot 375 is such that the first four steps of movement of the differential mechanism does not effect any movement of the bar 3720. As the lowest read or reset key controls the fourth step of movement of the turn to zero differential arm 5, it follows that depression of this key does not cause, upon an operation of the machine, shifting of the bar 3720. Depression of the second key from the bottom of the turn to zero bank or any above that, however, will when the machine is operated, cause the pin 376 of the arm 367 to engage the bottom of the slot 375 and shift the bar 3720 to differential extents determined by that one of the keys above the lowest of turn to zero bank which has been depressed. The keys of the turn to zero bank are denominated, beginning at the bottom of Fig. 6, "Clerks's individual cash read", "Clerk's individual received on account read", "Transaction read", "Clerk's individual cash reset", "Clerk's individual received on account reset" and "Transaction reset."

It should be remembered that depression of a key of the clerk's band, and the cash key of the transaction bank effects when the machine is operated, the lifting of both the "clerk's individual cash" and the "transaction" sets of totalizers, but since only one totalizer should be in mesh with the actuators at a time in reading or resetting operations, to read or reset one of the clerk's individual "cash" totalizers not only must the proper clerk's key and the proper transaction key be depressed, but also the proper one of the "clerks' individual cash read" or "clerks' individual cash reset" keys of the turn to zero bank, either of which keys serves to prevent the raising of the transaction set of totalizers in reading or resetting operations which would otherwise take place by the depression of the proper clerk's key and the proper transaction key. Similarly to "read" or "reset" the proper "clerk's individual received on account" totalizer "clerks' individual received on account read" and "clerks' individual received on account reset", keys are provided in the read or reset bank which serve to prevent raising of the "transaction" set of totalizers along with the desired "clerk's individual received on account" totalizer in such operations. There are, in all, six keys in the turn to zero bank, the remaining two serving to select the proper cams for reading or resetting the totalizers of the "transaction" set. As shown in Fig. 6, a space of one key is left between the two upper keys of the turn to zero bank, which is done for convenience of manufacture, and to simplify the construction for controlling the counter selecting mechanism by differential positioning of the bar 3720.

Referring to the coöperation between this bar 3720 and the counter selecting bar 291 so that the former bar will prevent engagement of more than one totalizer with the actuators which would otherwise take place in certain adjustments of the latter bar, it will be seen that if no key of the transaction bank is depressed, the selector bar 291 thereof will be moved one step, being stopped at such position by a stop member of the transaction bank of keys corresponding to the zero stop of the amount differential bank. This one step of movement of bar 291 does not disengage the projecting portions 337 and 338 of the lower portion of the bar 291 from the pins 339 corresponding with the transaction and clerks' individual received on account sets of totalizers, and thus would allow the clerk's individual cash reset only to be raised into engagement with its actuator if the machine were operated with no "transaction" key depressed. In "reading" or "resetting" operations then depression of a key of the clerk's bank and the clerk's individual cash key of the turn to zero bank results in the shifting of the bar 291 of the transaction bank one step which as described will then prevent raising of all but the "clerk's individual cash" set of totalizers. The "clerk's individual cash read" key of the turn to zero bank does not shift at all the selector bar 3720 for the turn to zero bank of keys and consequently with the machine operated with a "clerk's" key and clerk's individual cash read key depressed, a reading of the desired clerk's individual cash totalizer can be had. In this operation it should be remembered no "transaction" key is depressed. To read a clerk's individual "received on account" totalizer, not only is the desired clerk's key depressed, but also the "received on account" transaction key as well as the "received on account" read key of the turn to zero bank. The depression of the clerk's key shifts the clerk's totalizers laterally to aline the proper ones with the actuators and the depression of the "received on account" key of the "transaction" bank permits three steps of movement of the counter selecting bar 291 of the "transaction" bank, which movement of such bar is such as to permit raising of both the clerks' individual "received on account" and the transaction sets of totalizers by the shifting of the bar 295. Depression of the "received on account read" key of the turn to zero bank, however, allows the differential mechanism of this bank with its arm 367 to move five steps, which, by engagement of pin 376 with the lower portion of slot 375, is effective to lower the bar 3720 one step. This lowering of the bar 3720 one step serves to engage the projection 377 of the lower portion of the bar 3720 over the pin 339 of the plate 332 for the transaction set of totalizers, but is not sufficient to engage any of the other projections of this bar with the pins of the plates for the other sets of totalizers. Consequently depression of the clerk's individual received on account read key of the turn to zero bank through resulting adjustment of the bar 3720 serves to prevent the throwing in of the transaction set of totalizers which would otherwise take place along with the throwing in of the clerk's individual "received on account" set as controlled by the "received on account" key of the transaction bank.

To read any of the totalizers of the transaction set, the proper transaction key is depressed to shift the set of totalizers to aline the desired one with the actuators. The transaction read key of the "turn to zero" bank is also depressed which would not be necessary, however, if it were not for the fact that when two of the totalizers of this set are to be thrown in, namely, the "cash" and "received on account", the clerk's individual "cash" and the "clerk's individual received on account" are normally engaged with the actuators. This makes necessary control of such operations by the "turn to zero" bank, and the depression of the transaction read key of this bank serves to shift its selector bar 3720 two steps, which is sufficient to engage projections 378 and 379 on the under side thereof over the pins 339 of the plates 332 of the clerks' individual "cash" and clerks' individual "received on account" sets of totalizers. This positioning of the bar 3720 by two steps of movement carries a recess 380 of the bar 3720 above the pin 339 of the plate 332 of the transaction set of totalizers leaving this set free to be engaged with the actuators.

To reset and leave at zero a clerk's individual "cash" totalizer the proper clerk's key is depressed and also the clerk's individual cash reset key, but no transaction key. Upon operating the machine with these keys depressed the selector bar 291 of the transaction bank moves one step in which position it permits engagement of the clerk's individual "cash" set of totalizers only with the actuators and while the clerk's individual "cash reset" key is not necessary for selecting the proper counter in this operation, the depression of this key is essential for throwing in the resetting cam 351 to control the time of shifting of the bar 295. To reset and leave at zero the clerk's individual "received on account" totalizer, the proper clerk's key, the "received on acc't" key of the transaction bank, which allows the differential mechanism of this latter bank to move three steps, and the clerks' individual "received on account" reset keys are depressed. The "received on account" key of the transaction bank when depressed, allows the selector bar 291 to move three steps and permit engagement of the clerks' individual received on account and the transaction sets of totalizers with the actuators. Depression of the clerk's individual received on account reset key of the turn to zero bank, however, causes the selector bar 3720 of this bank to move four steps which positions the projecting lower portion 381 of the bar 3720 over the pin 339 of the plate 332 of the transaction set of totalizers, so as to prevent raising of this set into engagement with the actuators, and thus allowing in such operations, only the clerk's individual "received on account" set of totalizers to be raised into engagement with the actuators. Four steps of movement of the bar 3720 carries the forward portion of recess 382 above the pin 339 of the plate 332 of the clerk's individual received on account set of totalizers and permits engagement of this set with the actuators.

To reset and leave at zero any of the totalizers of the transaction set the proper key of the transaction bank is depressed as well as the "transaction reset" key of the "turn to zero" bank. The depression of the proper "transaction" key serves to shift the "transaction" set of totalizers laterally to aline the desired one with the actuators and since the "transaction reset" key of the "turn to zero" bank, when depressed, would as shown in Fig. 6, permit movement of the bar 3720 six steps, this bar would be positioned so that the projecting portion 377 on the underside of this bar would engage over pin 339 of arm 333 of the "clerk's individual cash" set of totalizers and the projecting portion 383 at the rear of the recess 382 in the under side of this bar would engage over pin 339 of arm 332 of the clerk's individual "received on account" set of totalizers. Both the "clerks' individual cash" and "clerks' individual received on account" sets would thus be prevented from rising into engagement with the actuators. Six steps of movement of the bar 3720, however, positions the cut away portion 3841 on the under side of this bar above the pin 339 of the arm 332 of the transaction set of totalizers, thus allowing the pawl 330 of this set to engage beneath its pin 329 on the arm 327 so that forward shifting of this arm by the bar 295 will raise the transaction set of totalizers to engage the alined one of this set with the actuators.

*Transfer mechanism.*

There are three sets of transfer mechanisms, one for each of the sets of grouped totalizers and the different totalizers of any one set when their elements are brought into alinement with the actuators are simultaneously brought into similar relationship with the transfer mechanism. Extending transversely of the machine beneath the totalizers are a series of curved bars 384 in the form shown, eight in number as many as there are different denominational elements of the totalizers. Referring to Figs. 1 and 2, these bars 384 will be seen to be slotted at their rear end at 385 for engaging over the shaft 293. The forward ends of these bars are recessed at 386 between projections 387 and 388 through which recesses passes the longitudinal shaft 298 normally seated in the bottom of the recess 386 and adapted, when the bar is moved, to slidably support the under side of the projection 387. A stationary shaft 2382, also projects through the recesses 386 and serves to guide the upper side of the projections 388 of these bars. These shafts 298 and 2382 serve to guide the bars 384 in forward and backward movements, the objects of which will appear later. The shaft 298 carries arms 390 provided with rollers 391 which normally engage in corresponding curved recesses 392 on the under side of the bars 384, thus serving to normally prevent shifting of these bars. The shaft also rigidly carries near one end an arm 399, which pivotally connects at 393 with one end of a link 394 the opposite end of which is slotted at 395 to engage over and be guided by the drive-shaft D as shown in Fig. 15. This link carries a roller 396 laterally projecting from its side into cam groove 397 in one side of a cam 398 mounted on the drive shaft. The shape of the groove 397 is such that during the time in which transferring operations are to take place in the machine, and during the time that engagement of the totalizer pinions with their zero stops in turn to zero operations takes place, this link will be raised to rotate the shaft 298 and cause the rollers 391 of the arms 390 to be disengaged from their recesses 392 in the bars 384.

Figure 3:
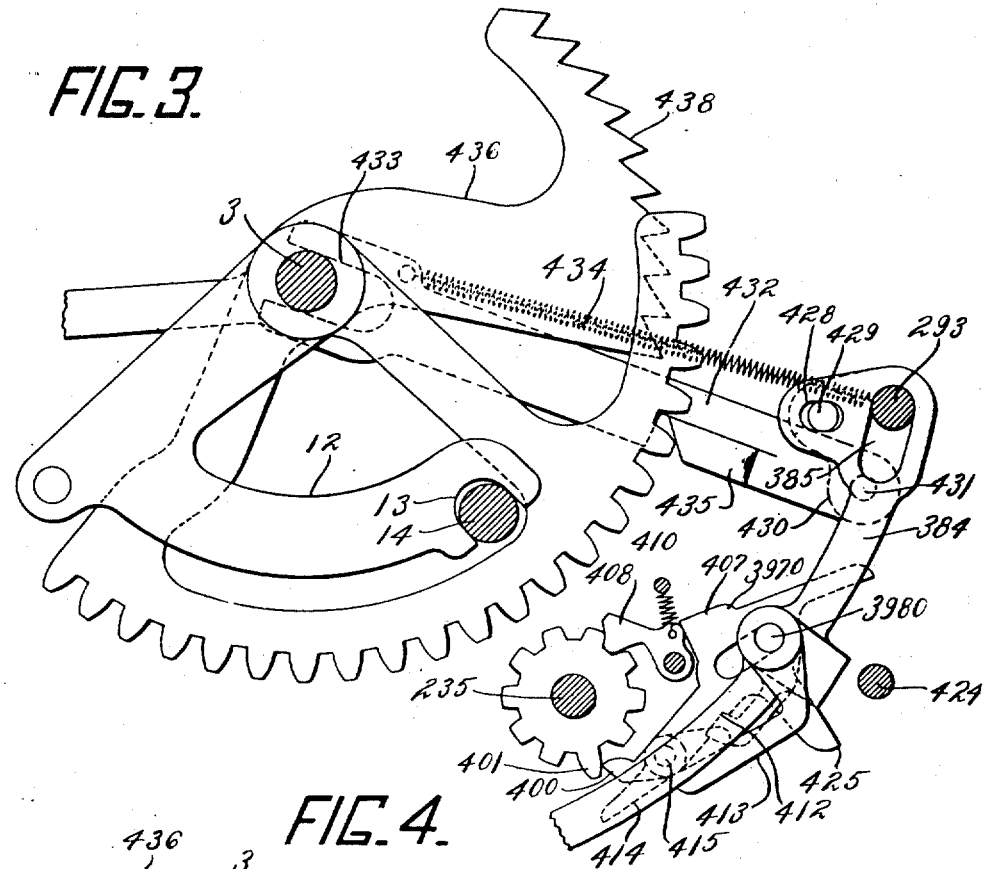
Fig. 3 is a sectional view showing the transfer and a portion of the turn to zero mechanism.

The bars 384 by reference to Figs. 1, 2 and 3, will be seen to carry the transfer mechanism. To this end all of these bars carry pins 3980 one for each of the sets of grouped totalizers. Pivotally mounted on these pins 3980 are plates 3940 having forward-downwardly projecting portions 3950 and rear downwardly projecting fingers 3960 as shown in Fig. 12. Beneath the lower surfaces of the forward depending portions 3950 pass the longitudinal shafts 243 of the two clerks' individual sets of totalizers and the shaft 252 of the transaction set of totalizers. These shafts being raised with the frames that raise the sets of totalizers, by engagement with the lower surfaces of the forward depending projections 3950 of the plates 3940 serve to raise the forward ends of these plates along with the raising of the totalizers.

Pivotally and slidably mounted upon the pins 3980 at the side of the plates 3940 are plates 3970 having slots 3981 working over the pins 3980. Forward projecting portions 3990 of these plates carry fingers 400 normally in the path of long teeth 401 of their corresponding totalizer wheels. Springs 402 are connected at one end at 403 with the upper portions of plates 3970, and at their other ends at 405 with the rear depending fingers of the adjacent plates 3940, these springs extending around pins 406 projecting from the sides of the fingers 3960 of the plates 3940 which springs serve to normally retain the plates 3970 in such position that their forward fingers 400 are in the paths of their coöperating long teeth 401 of the totalizer pinions. Inclined upwardly projecting portions 407 of these plates 3970 engage the rear sides of detent pawls 408 for preventing overthrow of the corresponding totalizer pinions by the transfer mechanism. The detent pawls 408, one for each totalizer pinion, are loosely mounted on the shaft 4100 and the springs 409 connecting them to the shaft 410 tend to keep the detents into engagement with the totalizer pinions. The shafts 410 and 4100 are carried by the totalizer frames carrying the totalizers so that the pawls are moved longitudinally with the totalizers as a unit whenever the totalizers are moved to keep the pawls in constant engagement with the corresponding totalizer pinions. When the totalizers and forward portions of the transfer mechanisms are lowered after the operation of the machine the forward edges of the upwardly projecting portions 407 of the plates 3970 positively engages the rear portion of the detent pawls 408 as shown in Fig. 12, and serve to hold the totalizer pinion locked, but these forward surfaces of the portions 407 are adapted to clear the rear edges of the detent pawls 408 when the transfer mechanism and the totalizers are in raised position and permit these pawls to yield against the tension of springs 409 connecting them to the shaft 410.

There is a pawl 411 for each plate 3970 which normally engages with a notch 412 in the under side of the forward portion of this plate, and prevents its rearward movement under the impulse of spring 402. These pawls 411 are rigid with depending and forwardly projecting arms 413 which extend beneath pawls 414, then beneath the rear arms of pawls 414 pivoted at 415 to the plates 3970 for the next lower order wheels. The forward arms of these pawls 414 normally rest on laterally projecting pins 416 which extend from the sides of plates 3940 of next lower order. By this construction whenever a totalizer pinion passes from "9" to "0" its long tooth will engage its corresponding finger 400 on adjacent plate 3970 and swing this plate 3970 downwardly about its pivot 3930. The forward portion of plate 3970 swinging downwardly carries with it, of course, the pivot 415 of its pawl 414 and since the forward arm of this pawl 414 is supported by the pin 416 projecting from the side of adjacent plate 3940 the rear portion of the pawl will be forced downward, and to a distance farther than is the pivot 415, which depression of the rear end of pawl 414 by engagement with its adjacent arm 413 will rock said arm and its rigidly connected dog 411 engaging in the notch 412 of the plate 3970 of next higher order and disengage this dog 411 from the higher order plate 3970. As soon as the higher order plate 3970 is freed in this way its spring 402 acts to draw it rearwardly the length of the slot 3981 so as to engage its projecting finger 400 behind another tooth of its totalizer pinion. This backward pulling of the plate 3970 by spring 402 is also accompanied by an upward swinging of its forward end also effected by the action of the same spring.

In the way just described the tripping of the transfer members takes place. The actual transferring operations occur, however, upon the restoration of the tripped transfer mechanisms which is provided for as follows.

Two arms 417 as shown in Fig. 13 are mounted for oscillation about the central shaft 3 of the machine, which arms are rigid with arms 418 to which are connected at 419 one end of corresponding links 420, the opposite ends of which are slotted at 421 to engage over and be guided by the drive shaft D of the machine. Pins 422 project laterally from the links 420 and into grooves 4220 in the side of cams 423 which cams through these connections, serve to forwardly oscillate the arm 417 near the end of one complete rotation of them and the drive shaft which carries them. These lower arms 417 support three shafts 424 which are located at the rear of downwardly projecting portions 425 of the plates 3970 and when these shafts 424 are moved forwardly by the oscillation above described, they engage their corresponding depending projections 425 of the plates 3970 and positively move these plates back to their forward position against the tension of the spring 402. In this forward movement of the plates the teeth 400 thereon which were engaged behind teeth on their corresponding totalizer elements serve to rotate such elements one step in a forward direction and the projecting portion 407 of the plates 3870 engages the detents 408 of the totalizer pinions positively to prevent overthrow of the pinions upon restoration of the plates. When the plates 3970 are restored to their normal forward position springs 426 connected at 405 to the rear depending portions 3960 of the plates 3940 and at their other end to rearwardly extending ears 427 rigid with the arms 413 and dogs 411 act to raise the forward ends of these dogs into their recesses 412 in their corresponding plates 3970, which dogs then serve to retain the plates 3970 in their forward position when the shafts 424 and the arms carrying them move rearward to their normal position.

In reading or resetting operations the movements of the main differential mechanism is to be controlled by the distance the totalizer pinions move in returning one step past zero positions. In such operations the totalizers are connected with their actuators before the forward movement of the actuators is begun, that is while the latter are in their normal position, it being remembered that the normal position of the arms 5 is one step of movement below their zero position. This extra step of movement of the differential mechanism from zero to normal position is provided because the means employed for disconnecting the members of the main differential mechanism which have a constant movement at each operation of the machine from the differentially movable arms 5 is operated for this purpose when their corresponding totalizer elements have moved reversely one step past their zero position to their one position and this means will now be described:

The arms 384 which, as above described, carry the transfer mechanisms are provided on their rear ends with slots 428 in which play pins 429 on plates 430 pivoted about the shaft 293. These plates 430 pivotally connect at 431 with one end of bars 432, the opposite ends of which are slotted at 433 to engage over and be guided by the central shaft 3 of the machine. Springs 434 are connected to the bars 432 and to the shaft 293 and serve to normally hold these bars in their rearmost positions even when the rollers 391 carried by the arms 390 are out of the recess 392 in these bars. In reading or resetting operations, however, transfer elements are not tripped and the totalizer elements are rotated in a rearward direction. In such operations the long teeth of the totalizer pinions when the pinions reach their zero positions will engage the ends of the fingers 400 of the plates 3970 on the forward sides and since the pawls 411 prevent such plates from moving rearwardly relative to the pins 3980, and the bars 384 which carry them, and since the bars 384 can yield rearwardly against the action of the springs 434, the rollers 391 on arms 390 at such times being out of their recesses 392, these bars 384 will so yield in a rearward direction by their connected totalizer elements as they move from their zero to their ones positions by the engagement with their long teeth against the ends of the fingers 400. This rearward shifting of the bars 384, through their connection above described with the bars 432, serves to force such bars longitudinally toward the central shaft 3. These bars are provided with offset flanges 435 pointed and extending toward the central shaft 3 of the machine, and coöperating with these pointed flanges are levers 436 mounted for oscillation about the central shaft 3 and toothed at their rear enlarged ends 437 and 438 for coöperation with the pointed flanges 435. The opposite ends of the levers 436 extend forwardly alongside their corresponding differential arms 5, and are slotted at 439 to engage over pins 440 Figs. 2 and 4 carried by the pivoted members 21 of the differential mechanism above described. The pins 440 are in front of the pivots 22 of these pivoted members 21 and the lowering of the forward arms of the levers 436 relative to the arms 5, serves to trip the pivoted members 21 and free the pins and links 8 and 9 respectively of the differential mechanism. The rearward shifting of the bars 384 and resulting longitudinal movement of the bars 432 toward the central shaft 3 of the machine, and slight raising of the rear end of the bars 432, which accompanies their movement toward the shaft 3, serves, through the pointed flanges 435 and teeth 438, to slightly raise the rear ends of the levers 436, and at the same time, of course, to lower the forward ends of these levers. This downward movement of the forward ends of the levers, however, through the pin and slot connections 439 and 440, serves to trip their pivoted members 21 and free the corresponding rollers and links 8 and 9 respectively, which rollers then ride up in the grooves 28 adjacent them at the time they are tripped, thus freeing the differential arms and permitting them to move farther without any further movement of their differential arms 5, and gear segments 2.

In a read operation of the machine, as the totalizer is not rocked out of engagement with the actuating segments 2, until after these segments are returned to their normal home position, it is evident that the totalizer pinions will be turned upon return movement of the segments in a reverse direction and to the same extent that they were turned upon forward movement of the segments from normal or home position so that the same amount which was on the totalizer at the beginning of the operation of the machine is left on the totalizer. In a reset operation, however, the selected totalizer is rocked out of engagement with the actuating segments 2 after the driving arms 11 have reached the ends of their forward movement and the totalizer pinions all stand at their "nine" position instead of their proper "zero" position. Near the end of the operation of the machine, however, the arms 417 are actuated by the cam 422 and as the shafts 424 are supported by these arms they engage the projections 425 of the plates 3970 and positively move the transfer mechanism and the bars 384 one step to normal position, relative movement between the transfer mechanism and the bar 384 being prevented by the pawls 411. As the fingers 400 on the plates 3970 are still in engagement with the long teeth 401 of the totalizer pinions, all of the pinions of the totalizer that is being reset are moved one step upon movement of the bar 384 and transfer mechanism to normal position so that indicators in reset operations will display and print numerals which are one unit less than the number of steps of movement received by the corresponding totalizer elements, so the amount printed and indicated will be that standing on the totalizer at the beginning of the operation of the machine. That is to say that the extent of movement of the differentially movable arms 5, which always determines the movement of the type wheels and the indicators will have as many steps of movement in an adding operation as in a total taking operation, when the amount set up on the indicators and type carriers in an adding operation is the same as the amount which stands on the selected totalizer at the beginning of a total taking operation. To provide for this extra step of movement of the totalizer pinions past zero position in a reset operation so that the proper amount will be indicated and printed, the differentially movable arms 5 are normally one step below their normal or home position and the selected totalizer is thrown into engagement with the actuating segment gears before movement of the segment gears is begun, as has been explained. It is therefore evident that in a total taking operation the differentially movable arms 5 have as many steps of movement from normal position as the totalizer pinions have in moving one step past "zero" position from their positions at the beginning of the operation of the machine. In an adding operation, however, the totalizer is moved out of engagement with its actuating segment gears when the latter reach their zero positions during their return movement, after which the gears move one more step to their normal or home positions without effecting movement of the pinions so that the segment gears move one more step than the totalizer pinions in an adding operation. In this way the extra step of movement of the differential mechanism is utilized in moving the totalizer pinions their extra step of movement in a total taking operation and as the totalizer pinions in an adding operation are not given an extra step of movement and the extra step of movement of the differential mechanism is not employed to drive the pinions, the differential mechanism is given the same extent of movement in an adding operation as in a total taking operation and the amount on the totalizer in a total taking operation is the same as the amount set up on the keys in an adding operation. For example, in an adding operation when the "5" key is depressed, the corresponding differential mechanism for the bank of keys will have six steps of movement and "5" will be displayed by the corresponding indicator set up on the corresponding type carrier, and added on the totalizer which is rocked out of engagement with the actuating segments when the latter reach their "zero" positions. In a reset operation when "5" is on the totalizer pinion, the pinion is moved six steps in the reverse direction but as the differential mechanism now moves the same number of steps as in an adding operation, the indicator will again display "5" and the same will be set up on the corresponding type carrier.

*Alining device.*

The sets of totalizers when adjusted laterally, are alined in adjusted position by alining members 441 (Fig. 13). These are provided with teeth 442 which engage with notches in the totalizer frames and prevent longitudinal shifting of them after they have been adjusted. The alining arms 441 are moved upwardly into engagement with these notches on the lower sides of the totalizer frames under control of a cam on the drive shaft. The alining arm 441 for the transaction set of totalizers is rigid with an arm 445 connecting with a link 446 intermediate its ends. Rigid with arms 445 and 441 of the transaction set of totalizer frames is another arm 447 pivotally connected at 448 with a link 449, the opposite end of which is slotted at 450 to engage over and be guided by the drive shaft D. This link 449 carries a roller 451 projecting laterally therefrom into a groove 452 in that side of cam 423 opposite that in which the groove 422 is located. This cam in this way serves to lower the link 449 and the alining arm 441 for the transaction set of totalizers previous to the lateral adjustment of the totalizers and to raise them after they have been adjusted. The two outside arms 441 for the clerks' individual "cash" and clerks' individual received on account sets of totalizers are simultaneously disengaged from and engaged with their totalizer frames by arms 453 and 454 connecting with the adjacent ends of the link 446, rigid with their alining arms 441.

The shaft 294 which guides and supports the forward end of counter selecting bar 291 for the transaction keys, carries alining pawls 455 adapted to engage in notches 456 in the upper surface of this bar and in the notches 457 in the upper surface of the read and reset selector bar 3720. These pawls are raised to free these selector bars for a short time at the beginning of an operation of the machine and for a short time at the end of an operation by means of an arm 4560 Fig. 20 rigid with the shaft carrying these pawls, and pivotally connected at 4570 with the lower end of a link 458, the opposite end of which is slotted at 459 to engage over and be guided by the drive shaft D of the machine. This link carries a roller 460 projecting laterally from its side into a cam groove 461 in one side of a cam 462, which groove is of suitable shape to free and aline the selector bars at desired times.

*Customer counters.*

In addition to the sets of counters above described a set of step by step counters are provided, which serve to keep a record of the number of the different kinds of transactions entered in the machine. These are shown in Fig. 19 as supported by curved plates 4000 mounted on shafts 4010 and 4020 carried by the frame of the machine. Beginning at the bottom, these different counters are respectively designed to register the number of "cash," "received on account," "paid out," "charge," "checks drawn," "bills paid," "collect on delivery," and "bills due" and "bank deposits" transactions, their relative arrangement corresponding with the relative arrangement of the transaction keys. Each of these counters is adapted to be actuated one step whenever the machine is operated to take care of a transaction to which the particular customer transaction counter pertains, and they are selected for operation under the control of the transaction printing shaft 97. Connected for actuating the corresponding counter projecting through and from the side of one of the plates 4000, are a series of actuating arms 4030 carrying pins 4040. These counters are arranged concentric to the central shaft 3 of the machine on which is mounted for oscillation, an arm 4050 slotted at one end at 4060 to engage over and be guided by this shaft. Near the other end of this arm 4050 a slot 4070 is provided in which plays a roller 4080 carried by one end of a two-armed lever 4090 loosely mounted upon the central shaft 3. The opposite arm of this lever is provided with a cam slot 4100 in which plays a roller 4110 projecting from an arm 4120 rigid with the shaft 97. By this construction differential angular adjustment of the shaft 97 which serves to control the positioning of the transaction printing segment also serves to differentially position the lever 4090 about its axis of oscillation 3, and through the pin and slot connections 4070 and 4080 with the arm 4050 to differentially position this latter arm about the same axis. This angular positioning of the arm 4050 is such that the depression of any transaction key effects when the machine is operated, the radial alinement of the arm 4050 with the pin 4040 of the corresponding customer counter actuating arm 4030.

After the arm 4050 is properly positioned in radial alinement with the pin 4040 of the counter which it should actuate, the arm 4050 is given a longitudinal movement. To this end it carries a laterally projecting pin 4130 which in any position of adjustment of the arm is adapted to be engaged by the curved head 4140 of another longitudinally shiftable member 4150 slotted at 4160 to engage over and be guided by the shaft 3. This member 4150 is longitudinally moved to engage the pin 4130 and carry the arm 405 longitudinally with it to engage the end of the latter with its alined pin 4040 and actuate the proper customer counter one step, from a cam 4170 having a cam groove 4180 in one side in which plays a roller 4190 projecting from one side of a link 4200, one end of which is slotted at 4210 to engage over and be guided by the drive shaft D of the machine, and the other end of which is pivotally connected at 4220 to a plate 4230 loosely carried by the shaft 4240. This plate 4230 is also connected by pin 4250 thereon working in a slightly elongated slot 4260 in the end of the longitudinally movable member 4150 with said member. An open ended slot 4270 is also provided in the end of the member 4150 by which this end of the member is supported and guided by the shaft 4240. The cam groove 4180 at each operation of the machine by an irregular portion thereof lifts the link 4200 thus swinging the plate 4230 in a clockwise direction about its shaft 4240. This angular movement of the plate 4230 through the engagement of pin 4250 thereon with its opening 4260 in the end of member 4150 serves to shift the latter member forwardly and to cause its curved head 4140 by engagement with projecting pin 4130 on the arm 4050 to shift the latter arm longitudinally and effect the desired actuation of the counters.

*Machine locking and key releasing mechanism.*

The bank of clerks' keys serves also to control the locking and unlocking of the machine, and the mechanism for so controlling the machine lock also serves to release depressed keys near the end of an operation of the machine. To this end the bank of clerks' keys shown in Fig. 17 of the drawings is provided with a detent plate 500 hung at 551 from arm 552 pivoted at 258 to the key bank frame, and pivotally connected at its other end at 553 with one arm of a bell crank 5541 pivoted at 261 also to the key bank frame and having a lug 554 at the end of its other arm which serves to stop the differential arm 5 of the differential mechanism for the clerks' bank of keys at the end of one step of movement in case the machine were operated without the depression of a clerk's key. The detent plate is normally held downwardly in the position shown in Fig. 17 by a spring 555 connected to it and the key bank frame, but is free to yield upwardly upon the depression of a clerk's key by engagement of a roller 556 of the depressed key with the inclined edge 557 of corresponding notch 558 of the detent plate. The width of these notches 558 is greater just below the inclined portions 557 and the restricted portions of these notches serve to provide a lock for the depressed keys when their rollers 556 are located below them and the detent is pulled downward by its spring 555. At the side of the detent plate 500 is a locking plate 559 supported at its top and bottom by arms pivoted at 258 and 261 respectively and similar to the link 552 for the detent plate. These locking plates have notches 560 of usual construction with projections 5561 at their mouths which serve, when the plate is raised, to engage beneath the rollers 556 on undepressed keys and lock such keys against depression. A spring 5600 tends to retain the locking plate in its lowermost position.

For raising the locking plate for the clerks' keys as well as similar ones for all other key banks, these plates are provided with notches 562 on the under side of their upper ends in which plays a rod 563 carried by upwardly extending arms of two separate plates 564 loosely mounted at 565 on one of the shafts 48 for the printing mechanism. A rod 566 also connects these plates 564 and helps to hold them rigid and in proper position. One of the plates 564 carries a pin 567 working in a slot 568 of a link 569, the lower end of which is pivotally connected with an arm 570 rigid with shaft 571. This shaft is also rigid with an upwardly projecting arm 572 having a projection 573 at its end for coöperating with a notch 574 in a plate 575 fast to the lower end of detent plate 500. The notch 574 in the normal condition of the machine is not opposite the projection 573, but right below it so that the portion of the plate above the notch serves to normally hold arm 572 rearward and the link 569 downward against the tension of spring 576 attached to the shaft 105 of the printing mechanism and to a link 577, the forward end of which pivotally connects at 578 with an arm 579 rigid with the shaft 571. This link 577 has other functions hereinafter described but in this way serves to make the springs 576 effective to forwardly oscillate the shaft 571 and arm 572 when such movement is permitted by raising the detent plate by depression of a clerk's key, to move the notch 574 opposite the projection 573 of the arm 572. This oscillation of the shaft 571 through arm 570, link 569, plates 564 and rod 563 is effective to raise the locking plates 559 of all the key banks and prevent any further depression of keys after a clerk's key is depressed.

The link 577 above referred to coöperates with locking mechanism for the drive shaft D. This drive shaft carries a disk 580 cut away throughout a portion of its periphery to form shoulders 581 and 582. An arm 583 pivoted at 584 has a lug 585 for engaging beneath shoulder 581 for locking the drive shaft against rotation. The link 577 is slotted at its rear upper end at 586 in which slot plays a pin 587 on the arm 583. A spring 588 connects at one end with the link 577 and at the other with the end of the arm 583 and tends to hold the arm 583 forwardly with its lug 585 in the path of the shoulder 581 on the disk 580, as shown in Fig. 17, so as to prevent rotation of the drive shaft. The oscillation of the shaft 571 by the force of spring 576, permitted when the key detent plate 500 is raised by the depression of a clerk's key, is accompanied by the shifting of link 577 rearward and through the engagement of the forward end of slot 586 of this link with pin 587 on arm 583 the link rocks said arm rearwardly to carry its lug 585 out of the path of shoulder 581 on the disk 580, thus unlocking the machine to permit rotation of the drive shaft. Near the end of a complete rotation of the drive shaft, and a complete operation of the machine, a pin 589 on the disk 580 engages a pin 590 on the link 577 and shifts the latter downwardly and forwardly to normal position, allowing the spring 588 to rock the arm 583 forwardly to carry its lug 585 into the path of shoulder 581 of the disk 580 and prevent more than one rotation of the drive shaft. The return of the link 577 to normal position rocks the shaft 571 in a clockwise direction to withdraw the arm 572 from the notch 574 of the key detent and to lower the link 569 and permit the springs 5600 for the locking plates 559 of the various key banks to lower their respective locking plates into normal position and release the keys.

The shaft 571 has arms 591, one for the detent plate for each bank of keys, and when this shaft is rocked in a clockwise direction near the end of an operation, as just described, it is rocked a little farther than to the normal position shown in Fig. 17, this additional movement being provided for by the pin and slot connections 586 and 587 between the link 577 and the arm 583, and this extra rocking of this shaft is effective to engage the arms 591 with their respective key detents and lift them temporarily to position the restricted portion of their notches 558 opposite the rollers 556 of depressed keys and allow the springs for the latter to return them to undepressed position. The springs 576 and 584 then return the shaft to the normal position shown in which the arms 591 clear the lower ends of their detent plates and allow the latter to be positioned by their springs 555 in their normal position.

*Operation.*

The operation of the various mechanisms of the machine has been explained in connection with the detailed description of the mechanisms, but a brief statement of the general operation of the machine as a whole is thought desirable and will now be given.

To operate the machine for entering items the proper amount keys are depressed, to control the differential movement of the amount actuators; then the proper transaction key which shifts the intermediate or transaction set of totalizers laterally of the actuators to aline the one corresponding to the depressed transaction key, with the actuators, and last the proper clerk's key is depressed which shifts the two outer sets of totalizers laterally of the actuators to aline the desired clerks' individual totalizers with them. The transaction key depressed also by its control over the counter selector bar 291 moved when the machine is operated, determines which of the sets of totalizers will be lifted into engagement with the actuators by the forward shifting of the bars 295. If the cash transaction key is depressed, both the clerks' individual cash and transaction sets of totalizers will be engaged with the actuators; if the received on account transaction key is depressed the transaction and the clerks' individual received on account sets will be lifted to engage the actuators, while if any of the other transaction keys is depressed, only the transaction set will engage the actuators when the machine is operated.

Operation of the machine with the proper clerks', transaction and amount keys depressed will result in the differential positioning of the differential mechanisms for these various key banks and the rocking into engagement with the actuators of the selected totalizers before their return movement so that said movement of the actuators will add the amount of the transaction on the selected totalizer. The forward movement of the actuators positions both the indicators and the printing segment in the manner described and at about the completion of one half of a rotation of the drive shaft the printing on the check and detail strip takes place.

In operations of the machine for reading or resetting no amount keys are depressed but instead the desired key of the read or reset bank. The keys of this bank control the selection of the cams for determining the time of rocking in and out of the counters and also, in combination with the transaction keys, the counter to be rocked into engagement with the actuators for reading or resetting. In both reading and resetting operations the backward movement of the totalizer wheels to one step past zero determines the differential setting of the amount actuators, the totalizers in such operation being engaged with the latter previous to their forward movement. In reading operations the totalizer remains in engagement with the actuators until the latter is completely returned to home position so as to leave the totalizer in original position while in resetting operations the totalizers are disengaged from the actuators before the return movement of the latter so as to leave the totalizer wheels at zero at the end of the operation of the machine. In reading or resetting operations, the indicators and the printing segments are set up in accordance with the forward movement of the actuators as is the case in item entering operations, the machine both indicating and printing the amounts originally standing on the totalizer being read or reset.

The actual transferring operation which take place upon the restoring of the tripped transfer elements takes place near the end of the operation of the machine after the totalizers have been disengaged from the actuators.

At the end of a rotation of the drive shaft D the latter automatically becomes locked against further rotation, the locking being accompanied by the releasing of depressed keys and the final establishment of normal condition in the machine.

While the form of mechanism herein shown and described is admirably adapted to fulfil the objects primarily stated, it is to be understood that it is not intended to confine the invention to the one form of embodiment herein shown and described, as it is susceptible of embodiment in various forms, all coming within the scope of the claims which follow.

What is claimed is:

1. In a machine of the class described, the combination with accounting mechanism, of differentially movable actuators therefor, a set of driving elements for the actuators having a constant movement at each operation of the machine, selective manipulative means, link connections between the driving elements and the actuators, and latch mechanism for holding the connections in driving relationship, rendered ineffective at times during the operation of the driving elements, dependent upon the manipulative means selected.

2. In a machine of the class described, the combination with accounting mechanism, of differentially movable actuators therefor, driving mechanism for the actuators having a constant movement at each operation of the machine including normally unextended toggle connections to the actuators, means carried by the actuators for retaining the toggle connections in their unextended condition, and a series of keys adapted to disable the retaining means at various points in the movement of the driving mechanism and permit the extending of the toggle connections during further movement of the driving mechanism without further driving of the actuators.

3. In a machine of the class described, the combination with differentially operable mechanism, of an actuator therefor, a driving member having a constant movement at each operation of the machine, a link adapted to form a driving connection between the driving member and the actuator, a pivoted member normally holding the link in driving relationship with the actuator, and a series of keys adapted selectively when in depressed position to disturb the pivoted member at different points in the movement of the driving member and actuator and free the link from driving connection with the latter whereby constant movement of the driving member may result in differential movement of the actuator and differentially operable mechanism.

4. In a machine of the class described, the combination with differentially actuable mechanism, of a differentially movable actuator therefor, a driving member having a constant excursion at each operation of the machine, an arm on the actuator, a link pivoted at one end to the driving member and bearing on one side of the arm with the other, a member pivoted on the arm adapted to normally prevent movement of the link relative to the arm and carrying a shoulder, a series of grooves, and a series of keys corresponding thereto adapted to be projected into the path of the shoulder on the pivoted member serving when engaged by the latter to arrest the arm and move the pivoted member to free the link and permit the latter to ride into the corresponding groove whereby the movement of the driving member may continue independent of further movement of the arm.

5. In a machine of the class described, the combination with differentially actuable mechanism, of a differentially movable actuator therefor, a driving member having a constant excursion at each operation of the machine, an arm on the actuator, a link pivoted at one end to the driving member and bearing on one side of the arm with the other, a member pivoted on the arm adapted to normally prevent movement of the link relative to the arm and carrying a shoulder, a series of grooves, a series of keys corresponding thereto but one less in number than the grooves, and adapted to be projected into the path of the shoulder on the pivoted member serving when engaged by the latter to arrest the arm and move the pivoted member to free the link and permit the latter to ride into the corresponding groove whereby the movement of the driving member may continue independent of further movement of the arm, a detent plate for the keys and a pivoted stop member connected thereto projecting normally into the path of the shoulder adjacent the extra groove serving to trip the pivoted member and free the link to ride into the zero groove, and to stop the arm at zero position when no key is depressed but adapted to be carried out of the path of the shoulder when the detent plate is moved by the depression of a key.

6. In a machine of the class described, the combination with a series of totalizer wheels having transfer tripping projections thereon, a set of pivotally and slidably supported plates having projections whereby they may be tripped by the tripping projections on the totalizer wheels, a set of spring controlled pawls serving normally to hold the plates against sliding movement and rigidly connected with a pawl releasing arm located adjacent the plate for the next lowest totalizer wheel, a series of two armed pawls carried by their corresponding plates adapted upon pivotal movement of said plates to actuate the adjacent releasing arm for the spring controlled pawl for the next higher totalizer wheel, springs tending to slide the plates when released by their spring controlled pawls and to swing them about their pivots to retain their projections adjacent their totalizer wheels, and means for engaging the plates which have been tripped to restore them to normal position to be retained by their spring controlled pawls, thereby causing their projections to actuate their corresponding totalizer wheels an additional step.

7. In a machine of the class described, the combination with a series of differentially movable printing segments, pivotally mounted type bars each bearing a plurality of type and carried thereby and normally unsupported at their free ends when in their zero printing position, supporting means for the free ends of the type bars effective when the latter are moved to print characters other than zero, and connections between the bars whereby the supported moved bar serves to support those of lower order so that impressions may be taken from them.

8. In a machine of the class described, the combination with a series of differentially movable amount printing segments, pivotally mounted type bars carried thereby and each bearing a plurality of type, connections whereby the lower order type bars cannot yield without the yielding of those of higher order, and a series of supports for the type bars effectively only when the latter are moved from zero positions.

9. In a machine of the class described, the combination with a series of differentially movable printing segments, of yielding type bars carried thereby, connections between the bars whereby those of lower order cannot yield without those of higher, projections carried by the printing segments projecting beneath the yielding type bars of the next lower order, and cut away portions on the type bars whereby the projection on a segment standing in zero position will not support its corresponding type bar against the impression of the printing platen unless said bar is moved by its segment to print other than zero.

10. In a machine of the class described, the combination with a series of sliding totalizers having their like denominational elements grouped together, of a single set of actuators therefor normally positioned in planes between corresponding elements of adjacent totalizers which are located intermediate the end totalizers of the groups, a series of keys, and a detent plate therefor operatively connected with the totalizers, having two sets of oppositely directed and differentially inclined slots, coöperating with the keys whereby the latter may position the elements of any of the totalizers in operative relationship with the set of actuators.

11. In a machine of the class described, paper feeding mechanism comprising the combination, of record strip supply and receiving rolls, means for reversely rotating the supply roll to position the record material to receive printing impressions, means for printing on the record strip when in reversely fed position, and means for thereafter rotating the receiving roll to feed the record strip forward to an extent in excess of its reverse movement by the supply roll.

12. In a machine of the class described, the combination of record strip supply and receiving rolls, a pawl for reversely rotating the supply roll, a second pawl for forwardly rotating the receiving roll, and actuating mechanism for the pawls adapted to give both of them their effective strokes at different times in the same operation.

13. In a machine of the class described, the combination of record strip supply and receiving rolls, a pawl for reversely rotating the supply roll, a second pawl for forwardly rotating the receiving roll, actuating mechanism for the pawls adapted to give both of them their effective strokes at different times in an operation, and means for disconnecting either pawl from its roll upon the connection of the other with the remaining roll.

14. In a machine of the class described, the combination of record strip supply and receiving rolls, a pawl for reversely feeding the supply roll, a second pawl for forwardly feeding the receiving roll, a controlling member for the pawls normally retaining the pawls out of operative connection with their rolls but adapted to alternately connect and disconnect the pawls from their rolls, means for giving the pawls one stroke of their movement when the supply roll is connected with its pawl to reversely feed the record strip, means for printing on the record strip when in reversely fed position, and means for giving the pawls their return stroke after the controlling means has connected the receiving roll with its pawl and disconnected the supply roll and pawl, to forwardly feed the record strip.

15. In a machine of the class described, the combination of record strip supply and receiving rolls, slotted arms adjacent the rolls, pawls carried by the arms for rotating the rolls when said arms are oscillated, a member adapted to be oscillated at each operation of the machine, and a plurality of links pivotally connected at one end to said member and at different distances from its axis, and carrying at their other ends projections working in the slots of the arms and adapted to rest upon the record material on the rolls whereby the angular feeding of a roll by its arm is controlled by the amount of record material thereon, and the record strip is moved to a greater extent by one roll than the other.

16. In a machine of the class described, the combination of record strip supply and receiving rolls, feeding means for the rolls for feeding the record strip in opposite directions, an oscillating member, and links connected to one end with the feeding means and at the other end with the oscillating member but at different distances from its pivot whereby oscillation of said member effects a greater movement of the receiving than the supply roll.

17. In a machine of the class described, the combination with a plurality of sets of totalizer elements, of actuating means therefor, means for engaging the totalizers with the actuating means, a differentially movable bar for selectively rendering the engaging means effective and ineffective on the various totalizers, a differentially movable member for moving said bar, a driving member having a constant extent of movement, link connections between the driving member and said differentially movable member, selective manipulative means, and latch mechanism for holding the connections in driving relationship rendered ineffective at times during the operation of the driving elements, dependent upon the manipulative means selected.

18. In a machine of the class described, the combination with a plurality of sets of grouped sliding counters, a common set of actuators therefor, a series of keys and connections for shifting the counters laterally to bring the desired ones in operative alinement with the actuators, engaging means for moving each set of counters to engage the counter elements alined with the actuator elements with the latter, and a differentially movable controlling bar for rendering the engaging means effective and ineffective selectively on the sets of grouped totalizers.

19. In a machine of the class described, the combination with a main operating mechanism, a plurality of customer counters, operating means therefor actuated by the main operating mechanism and having a single projection for selectively engaging all of the counters, key controlled means actuated by the main operating mechanism for moving the actuating means to bring its projection into coöperative relationship with either of said counters, so that the operating means actuates the counter in operative relationship therewith.

20. In a machine of the class described, the combination with a series of customer counters having actuating arms, an oscillating and longitudinally shiftable actuating bar, a differentially movable arm, a lever for oscillating the bar in accordance with the movement of the arm to position said bar in operable relationship with the actuating arm of any of said counters, a movable member adapted to longitudinally shift the bar when in any of its adjusted positions, and a cam and connections for actuating the movable member and through it and the longitudinally shiftable bar the selected counter.

21. In a machine of the class described, the combination with a totalizer comprising a set of denominational elements, projections carried by said elements to stop them at constant positions when reversely rotated, a set of actuators for reversely rotating the elements, a set of driving members for the actuators, links pivoted at one end to the driving members and adapted to normally engage the actuators to drive the latter at their other ends, pivoted members normally retaining the links in driving engagement with the actuators, pins on said pivoted members, a series of pivoted plates coöperating at one end with the pins, a series of bars moved by the projections on the totalizer elements when returned to their constant positions, and connections between the bars and their corresponding plates whereby movement of the bars moves the plates and thereby the pivoted members to free the links and break the driving connections between the driving members and the actuators whereby the movement of said driving members may continue independent of that of the actuators.

22. In a machine of the class described, the combination of a set of differentially movable actuators, driving members for the actuators having toggle connections therewith, accounting mechanism, and connections whereby the accounting mechanism may control the disturbing of the toggle connections to permit movement of the driving members independent of the actuators.

23. In a machine of the class described, the combination of a set of differentially movable actuators, constantly movable driving members therefor having link connections with the actuators, accounting mechanism, manipulative means and connections whereby either the accounting mechanism or the manipulative means may control the disturbing of the link connections between the driving members and the actuators for controlling the differential movement of the latter.

24. In a machine of the class described, the combination of accounting mechanism, differentially movable actuators therefor, a set of driving elements for the actuators, manipulative means, and connections between the driving elements and the actuators movably mounted on and carried by the driving elements, rendered ineffective at times during the operation of the driving elements controlled by the manipulative means.

25. In a machine of the class described, the combination with actuating mechanism, of a series of counters adapted to be engaged therewith, selecting mechanism for selecting pluralities of counters for simultaneous engagement with the actuating mechanism, manipulative devices and mechanism controlled thereby for permitting but one of the selected plurality of counters being engaged with the actuating mechanism.

26. In a machine of the class described, the combination with a plurality of totalizers, of a common set of actuators therefor, a shiftable bar for engaging the totalizers with the actuators, a second movable bar, and manipulative devices for controlling the movement of said second bar whereby to determine the totalizer to be engaged with the actuators by the first mentioned bar.

27. In a machine of the class described, the combination with a set of differentially movable actuators, of a constantly movable driving member therefor, links pivoted at one end to the actuators and at the other to corresponding accounting elements, a fixed member for limiting the movement of the intermediate portions of the links in one direction, a series of arms supported by the driving member one for each link, and connections for rocking the arms as the driving member is moved to cause them to engage the links to insure the intermediate portions of the latter engaging the fixed member at the completion of movement of the driving member.

28. In a machine of the class described, the combination of a series of totalizer wheels having transfer tripping projections thereon, a set of movable plates capable of longitudinal movement and having projections whereby they may be tripped by the tripping projections on the totalizer wheels; a set of pawls for holding the plates against longitudinal movement; means for moving the plates to tripped positions when the pawls are released; and, connections whereby the tripping of the plates by the totalizer elements disconnects the pawls from the next higher plates to permit the latter to be moved by their moving means.

29. In a machine of the class described, the combination of a series of totalizer wheels having transfer tripping projections thereon, a set of movable plates having projections whereby they may be tripped by the tripping projections on the totalizer wheels; a set of pawls for holding the plates against longitudinal movement; means for moving the plates to tripped positions when the pawls are released; connections whereby the tripping of the plates by the totalizer elements disconnects the pawls from the next higher plates to permit the latter to be moved by their moving means; and means for restoring the moved plates to normal position to effect transfers.

30. In a machine of the class described, the combination of a plurality of totalizer pinions; a plurality of transfer plates therefor; holding means for the plates normally preventing all but a pivotal movement of the plates; projections on the totalizer pinions adapted to engage their corresponding transfer plates and swing the latter about their pivots when the totalizer pinions pass from nine to zero positions; and connections whereby the swinging of a transfer plate about its pivot disables the holding means for the next higher transfer plate and permits the movement of said higher plate to add one to its totalizer pinion.

31. In a machine of the class described, the combination of a plurality of totalizer pinions; a plurality of pivotally and slidably mounted transfer elements; means for holding the transfer elements against sliding movement but permitting their pivotal movement by their totalizer pinions passing from nine to zero; yielding means tending to withdraw the transfer elements against the effect of their holding means to engage them behind teeth of their totalizer pinions; means for restoring withdrawn plates to effect transfers to their totalizer pinions; and means whereby the pivotal movement of a transfer element caused by its totalizer pinion passing from nine to zero renders the holding means for the next higher transfer element ineffective so as to permit its transfer effecting movements by its yielding and restoring means.

32. In a machine of the class described, the combination of a set of actuators; a set of totalizer pinions normally disengaged therefrom; transfer plates; a stationary pivot for the transfer plates; means for moving the totalizer pinions into engagement with the actuators and the transfer elements upwardly about their pivots; and locking pawls for the totalizer pinions positively held in engagement with them by the transfer elements while the pinions are being disengaged from the actuators.

33. In a machine of the class described, the combination of a totalizer pinion; a transfer element therefor; a detent for the pinion; and connections whereby the transfer element controls the detent to prevent overthrow of the pinion when a transfer is effected.

34. In a machine of the class described, the combination of a totalizer pinion; an actuator therefor; a transfer element for the pinion; a detent yieldingly held in engagement with the pinion; and connections whereby the transfer element positively holds the detent in engagement with the pinion when the latter is being moved out of engagement with the actuator.

35. In a machine of the class described, the combination with a series of totalizers having their like denominational elements grouped together, of a sliding frame carrying said totalizers, a single set of actuators for the totalizers normally positioned intermediate the planes of the end totalizer elements of their denominational groups, a pivoted member having a cam groove for shifting the totalizer frame laterally, a series of keys, and a detent plate therefor operatively connected to said pivoted member having two sets of oppositely directed and differentially inclined slots coöperating with the keys whereby the latter may rock the pivoted member differentially to position the elements of any of the totalizers in operative relationship with the set of actuators.

36. In a machine of the class described, the combination of accounting mechanism, differentially movable actuators therefor, a set of driving elements for the actuators, and connections between the driving elements and the actuators and carried by the driving elements, rendered ineffective at times during the operation of the driving elements controlled by the accounting device.

37. In a machine of the class described, the combination with a set of differentially movable actuators, of a series of totalizers adapted to be engaged therewith, differently timed cams, a shifting device for moving the totalizers into engagement with the actuators, a differentially movable arm for selectively connecting said shifting device with any of said cams, means for selecting pluralities of totalizers for simultaneous engagement with the actuators, and a differentially movable bar also actuated by said differentially movable arm for permitting but one of the selected plurality of totalizers being engaged with the actuators.

38. In a machine of the class described, the combination with a set of differentially movable actuators, of a series of totalizers adapted to be engaged therewith, a shiftable bar for engaging the totalizers with the actuators, a differentially movable bar for selecting pluralities of totalizers for simultaneous engagement with the actuators, manipulative means, and a second differentially movable bar controlled by said manipulative means for permitting but one of the selected plurality of totalizers being engaged with the actuators.

39. In a machine of the class described, the combination with a main operating mechanism, of a series of totalizers, actuators for the totalizers driven by the main operating mechanism, a shiftable bar moved by the operating mechanism for engaging the totalizers with the actuators, a differentially movable bar actuated by the operating mechanism for selecting pluralities of totalizers for simultaneous engagement with the actuators, manipulative means controlling the extent of movement of said differentially movable bar, a second differentially movable bar also actuated by the operating mechanism for permitting but one of the selected plurality of totalizers being engaged with the actuators, and other manipulative means for controlling the extent of movement of said second differentially movable bar.

40. In a machine of the class described, the combination with a plurality of sets of totalizer elements, of actuating means therefor, means for engaging the totalizers with the actuating means, a differentially movable bar for selectively rendering the engaging means effective and ineffective on the various totalizers, a differentially movable arm for moving said differentially movable bar, and connections between said arm and said bar rendered ineffective at a constant point in the differential movement of said arm to permit continued movement of said arm independently of said bar.

41. In a machine of the class described, the combination with a plurality of sets of totalizer elements, of actuating means therefor, means for engaging the totalizers with the actuating means, a differentially movable bar for selectively rendering the engaging means effective and ineffective on the various totalizers and having a slot; a differentially movable arm for moving said bar differentially and having a pin engaging in the slot in said bar; a slotted member mounted on said bar; and a second pin working in the slot of said member to hold said member against the pin on said arm to prevent movement of the last mentioned pin in the slot in said bar, said slot in said member being constructed to move said member after said arm has moved a certain distance to permit movement of the pin on said arm in the slot in said bar.

42. In a machine of the class described, the combination with type carriers for making a record on a record strip, of a frame carrying said record material and normally in position for said record material to receive a written record, means for actuating said frame for carrying the record strip against said type carriers to receive a record therefrom, and means for feeding the record strip on said frame in one direction before movement of said frame so that said record strip is in printing position and for feeding the record strip in a reverse direction and to a greater extent after the printed record is made to present a fresh surface for a written record.

43. In a machine of the class described, the combination with a main operating mechanism, of a frame for carrying record material, means operated by the operating mechanism for actuating the frame, and means actuated by the operating mechanism independently of said first means for feeding the strips relative to the frame in reverse directions and to different extents at a single operation of the machine.

44. In a machine of the class described, the combination with a main operating mechanism, of a frame carrying a record strip adapted to receive two classes of records, a device actuated by the operating mechanism for moving said frame, and means actuated by said operating mechanism and independent of said device for moving the record strip in reverse directions and to different extents at a single operation of the main operating mechanism to move the record strip from one record receiving position to the other.

45. In a machine of the class described, the combination with a set of differentially movable actuators, of a constantly movable driving member therefor, accounting elements, links pivoted at one end to the actuators and at the other to corresponding accounting elements, a fixed member, a series of oscillatory arms pivotally mounted on the driving member one for each link and having slots, and stationary pins playing in said slots for causing oscillation of said arms upon movement of said driving member to engage said links whereby said links are forced into engagement with said fixed member to differentially move the accounting elements.

46. In a machine of the class described, the combination with a totalizer, of a set of actuators therefor, indicators bearing characters from 0 to 9, a set of actuators for the indicators, link connections between the actuators for the indicators and the totalizers, driving means for both sets of actuators, the link connections between the actuators of both sets being such that the actuators for the totalizers move one more step than the number displayed by the corresponding indicators.

47. In a machine of the class described, the combination with an accounting element, of an actuator therefor adapted to enter items thereon in an adding operation and turn the same one step past zero position in a turn to zero operation, the actuator moving the same extent in an adding operation as in a turn to zero operation when the amount to be added on the totalizer element in an adding operation is the same as the amount standing on the totalizer at the beginning of a turn to zero operation, and means for subsequently moving the accounting element back one step to zero position after it has been moved by the actuators in turn to zero operations.

48. In a machine of the class described, the combination with a totalizer, of printing mechanism for recording items entered on the totalizer and also the totals thereof, actuators for actuating the totalizer in both item entering and total taking operations and having a normal position one step from zero position; and manipulative means for controlling the actuators in an item entering operation, said totalizer being constructed to control the same in total taking operations and to be moved one step past zero position for this purpose, the one step of movement of the actuators from zero position being used to compensate for the extra step of movement of the totalizer so that the amount printed by the printing mechanism will be the same as the total standing on the totalizer at the beginning of the operation of the machine.

49. In a machine of the class described, the combination with accounting elements, of recording mechanism for recording items entered on the accounting elements and also the totals thereof, actuators for operating the accounting elements in both item entering and total taking operations and movable to the same extent in both operations when the amount added in an adding operation is the same as the amount standing on the accounting elements in a total taking operation, and transfer mechanism operated by the accounting elements in an adding operation when the elements pass from their nine to their zero position to effect transfers and in a total operation when the accounting elements pass from their zero to their nine positions to limit the movement of the actuators.

50. In a machine of the class described, the combination with accounting mechanism, of differentially movable actuators therefor, a set of driving elements for the actuators having a constant movement at each operation of the machine, selective manipulative means, link connections between the driving elements and the actuators rendered ineffective at times during the operation of the driving elements dependent upon the manipulative means selected.

51. In a machine of the class described, the combination with accounting mechanism, of differentially movable actuators therefor, driving mechanism for the actuators having a constant movement at each operation of the machine including normally unextended toggle connections to the actuators, means for retaining the toggle connections in their unextended condition, and a series of keys adapted to disable said retaining means at various points in the movement of the driving mechanism whereby to permit the extending of the toggle connections during further movement of the driving mechanism without further driving of the actuators.

52. In a machine of the class described, the combination with a series of differentially movable amount printing segments, of type bars pivoted to the segments and each carrying a plurality of type, connections whereby the free ends of the bars cannot yield without the yielding of those of higher order, and means for preventing the higher order bars from yielding when away from their zero positions.

53. In a machine of the class described, the combination with a series of differentially movable segments, type bars pivoted to the segments and each bearing a plurality of type, connections whereby the free ends of the lower order bars cannot yield without the yielding of those of higher order and means carried by each higher order segment for preventing the next adjacent higher order bar from yielding when said bar is away from its zero position.

54. In a machine of the class described, the combination with a series of differentially movable elements, of type bars pivoted to said elements and each carrying a plurality of type, said bars when at their zero positions being normally ineffective to print zeros, means carried by each higher order differentially movable element whereby movement of the next lower order type bar from its zero position will render said lower order bar effective to print zero, and connections whereby rendering said lower order bar effective to print zero will raise and support the other lower order bars in positions effective to print zeros.

55. In a machine of the class described, the combination with a totalizer, of differentially movable actuators therefor, a driving mechanism for the actuators comprising normally unextended toggle connections to the actuators, and means controlled by the totalizer for rendering said toggle connections ineffective at different points in the operation of the driving mechanism.

56. In a machine of the class described, the combination with a totalizer, of differentially movable actuators therefor, driving mechanism for the actuators having an invariable extent of movement at each operation and including normally unextended toggle connections to the actuators, means for retaining the toggle connections in their unextended condition, and means controlled by the totalizer for disabling said retaining means at different points in the movement of the driving mechanism.

57. In a machine of the class described, the combination with totalizer elements having transfer projections, of differentially movable actuators therefor, driving mechanism for the actuators having an invariable extent of movement and comprising normally unextended toggles forming the driving connections with the actuators, means pivoted to the actuators normally retaining the toggles in unextended condition, means whereby the totalizer may be set at zero by driving the actuators, devices operatively connected to and movable with the toggle retaining means for disabling said means, cams for moving said disabling means in a direction opposite to the direction of movement of the actuators whereby to disable the retaining means, and connections driven by the aforesaid transfer projections for operating the cams.

58. In a machine of the class described, the combination with a single set of actuators, of a plurality of sets of totalizers adapted to be engaged therewith, an invariably moved element, a separate means for each set of totalizers operated by said element for engaging the totalizers with the actuators, a differentially movable element for selecting pluralities of totalizers for engagement with the actuators, manipulative devices, and a second differentially movable element for disabling various combinations of the aforesaid engaging devices whereby to permit the engagement of but one totalizer at a time with the actuators.

59. In a machine of the class described, the combination with a totalizer, of differentially movable actuators therefor, an invariably moved driving mechanism, a series of normally effective toggles connecting the actuators and the driving mechanism, and means controlled by the totalizer for positively rendering the toggles ineffective at different points in the movement of the driving mechanism.

60. In a machine of the class described, the combination with a totalizer, of differentially movable actuators therefor, driving mechanism for the actuators having an invariable extent of movement at each operation and including normally unextended toggle connections to the actuators, means for retaining the toggle connections in their unextended condition, and means controlled by the totalizer for positively disabling said retaining means at different points in the movement of the driving mechanism.

61. In a machine of the class described, the combination with a plurality of sets of totalizers, of a set of actuators common thereto, an invariably moved element, an independent means for each set of totalizers operated by said element for engaging the totalizers with the actuators, a plurality of differentially movable devices controlling the engaging means singly and in combination, and independently operable manipulative devices controlling the differentially movable devices.

62. In a machine of the class described, the combination with a plurality of sets of totalizers, of a set of actuators common thereto, an invariably moved element, an independent means for each set of totalizers operated by said element for engaging the totalizers with the actuators, a plurality of differentially movable devices controlling the engaging means singly and in combinations, and a series of keys controlling each of the differentially movable devices.

63. In a machine of the class described, the combination with record strip supply and receiving rolls, of a pawl for turning the receiving roll in one direction and a second pawl for turning the supply roll in the opposite direction but to a lesser extent whereby to partially rewind the record strip on the supply roll and thereby space the strip, means for actuating both pawls at each operation, and means for automatically regulating the extent of movement of both pawls to maintain a uniform spacing of the record strip.

64. In a machine of the class described, the combination with record strip supply and receiving rolls, of a pawl for turning the receiving roll in one direction, a second pawl for turning the supply roll in the opposite direction but to a lesser extent whereby to partially rewind the record strip on the supply roll and thereby space the strip, means for actuating both pawls at each operation, and means controlled by the record strip for regulating the extent of movement of both pawls to maintain a uniform spacing of the record strip.

65. In a machine of the class described, the combination with a plurality of totalizers out of axial alinement, of actuators common to the totalizers, means for positively driving the actuators, and means common to the totalizers and adapted to be moved by any one of the totalizers to control the extents of movement of the actuators.

66. In a machine of the class described, the combination with a plurality of totalizers out of axial alinement, of actuators common to the totalizers, means for positively driving the actuators, and means common to the totalizers and adapted to be moved by any one of the totalizers to control and positively limit the extents of movement of the actuators.

67. In a machine of the class described, the combination with a plurality of parallel rows of totalizers, actuators common to the rows of totalizers, means for positively driving the actuators, and means common to the rows of totalizers and adapted to be moved by any totalizer of any row to control the extents of movement of the actuators.

68. In a machine of the class described, the combination with a plurality of totalizers out of axial alinement, of actuators common to the totalizers, driving means having an invariable extent of movement, latches connecting the actuators and the driving means, and means common to the totalizers and adapted to be moved by any one of the totalizers to control operation of the latches.

69. In a machine of the class described, the combination with a plurality of totalizers out of axial alinement, of actuators common to the totalizers, driving means having an invariable extent of movement, latches connecting the actuators and the driving means, and means common to the totalizers and adapted to be moved by any one of the totalizers to control operation of the latches and positively stop the actuators.

70. In a machine of the class described, the combination with a plurality of totalizer elements out of axial alinement, of an actuator common thereto, driving means for the actuator, a member movable with the actuator and having a limited movement relative to the actuator, means whereby movement of the actuator relative to the member renders the driving means ineffective to drive the actuator, and means movable by any one of said totalizer elements to engage and limit the movement of said member, an additional movement of the actuator relative to said member serving to render the driving means ineffective upon the actuator.

71. In a machine of the class described, the combination with a plurality of totalizer elements out of axial alinement, of an actuator common to the totalizer elements, means for positively driving the actuators, and a single stop common to the totalizer elements and adapted to be moved by any one of the totalizer elements to control the extent of movement of the actuator.

72. In a machine of the class described, the combination with a plurality of totalizer elements out of axial alinement, of an actuator common to the totalizer elements, driving means for the actuator, a latch connecting the actuator and driving means, a device associated with said latch, and a single stop common to the totalizer elements and adapted to be moved by any one of said totalizer elements to control said device and thereby said latch.

73. In a machine of the class described, the combination with a plurality of totalizer elements, of an actuator common to said elements and constructed to operate the elements simultaneously to add and separately to clear as desired, manipulative means for controlling the actuator for adding, and a stop moved by any one of said totalizer elements to control the actuator when the element is cleared.

74. In a machine of the class described, the combination with a plurality of totalizer elements out of axial alinement, of an actuator common to the totalizer elements and constructed to operate said elements in one direction to add and in the opposite direction to reset to zero, a set of stops selectively operable to control the actuator in adding, and an independent stop moved by any one of said totalizer elements to control the actuator when the element is reset.

75. In a machine of the class described, the combination with a plurality of totalizer elements, of an actuator common to said elements and constructed to operate the elements simultaneously to add and separately to clear as desired, means for positively driving the actuator, manipulative means for controlling the actuator for adding, and a stop moved by any one of said totalizer elements to control the actuator when the element is cleared.

76. In a machine of the class described, the combination with a totalizer element, of an actuator constructed to operate said element both to add and to clear as desired, means for positively driving said actuator, means for controlling said actuator in adding, and means in the path of movement of said element during both adding and clearing operations and constructed to be moved by said element to control the actuator when the element is cleared.

77. In a machine of the class described, the combination with a totalizer element, of an actuator constructed to operate said element both to add and to clear as desired, means for driving the actuator, a latch connecting the actuator and driving means, means in the path of movement of said totalizer element during both adding and clearing operations and constructed to be moved by said element to control said latch when the element is cleared.

78. In a machine of the class described, the combination with a totalizer element, of an actuator constructed to operate said element both to add and to clear as desired, means for positively driving said actuator, means in the path of movement of said totalizer element during both adding and clearing operations and constructed to be moved thereby, and a stop moved by movement of said means to control the actuator when the element is cleared.

79. In a machine of the class described, the combination with a totalizer element, of an actuator constructed to actuate said element both to add and to clear, means in the path of movement of said totalizer element during both adding and clearing operations and constructed to be moved thereby, and a stop moved by movement of said means to control the actuator when the totalizer element is cleared.

80. In a machine of the class described, the combination with a totalizer element, of an actuator constructed to actuate said element both to add and to clear, means for driving the actuator, a latch connecting said actuator and driving means, a device in the path of movement of said totalizer element during both adding and clearing operations and adapted to be moved thereby, and a stop moved by said device to control the operation of said latch when the totalizer element is cleared.

81. In a machine of the class described, the combination with a plurality of totalizer elements, of an actuator common thereto constructed to operate said elements both to add and to clear, means for positively driving said actuator, a plurality of devices, one for each totalizer element, in the path of movement of said elements during both adding and clearing operations, and constructed to be moved thereby, and means controlled by movement of said devices for controlling movement of the actuator during clearing operations.

82. In a machine of the class described, the combination with a plurality of totalizer elements, of an actuator common thereto, and constructed to operate said element during both adding and clearing operations, means for driving the actuator, a latch connecting the actuator and driving means, devices, one for each totalizer element, in the path of movement of said elements during both adding and clearing operations and constructed to be moved thereby, and means controlled by movement of said devices for controlling operation of said latch during clearing operations.

83. In a machine of the class described, the combination with a plurality of totalizer elements, of an actuator common thereto and constructed to actuate said elements both to add and to clear, means for positively driving said actuator, devices, one for each totalizer element, in the path of movement of the totalizer elements during both adding and clearing operations and constructed to be moved thereby, and a stop moved by said devices to control said actuator during clearing operations.

84. In a machine of the class described, the combination with a plurality of totalizer elements, of an actuator common thereto and constructed to actuate said elements both to add and to clear, devices, one for each totalizer element, in the path of movement of the totalizer elements during both adding and clearing operations and constructed to be moved thereby, and a stop moved by said devices to control said actuator during clearing operations.

85. In a machine of the class described, the combination with a plurality of totalizer elements, of an actuator common thereto and constructed to actuate said elements both to add and to clear, a latch connecting said actuator and driving means, a plurality of devices, one for each totalizer element, in the path of movement of the totalizer elements during both adding and clearing operations and adapted to be moved thereby, and a stop moved by said devices to control the operation of said latch during clearing operations.

86. In a machine of the class described, the combination with a totalizer element, of an actuator therefor constructed to actuate said element both to add and to clear as desired, a pivoted arm constructed to be rocked by said totalizer element during adding and to be moved bodily by said element when the element is cleared, and means operated by said arm to control the actuator when the totalizer element is cleared.

87. In a machine of the class described, the combination with a totalizer element, of an actuator constructed to actuate said element both to add and to clear as desired, a movable member, an arm pivoted on said member, the totalizer element being adapted to rock said arm in adding and to move the arm bodily when the element is cleared to move said member, and means operated by said member to control the actuator.

In testimony whereof I affix my signature in the presence of two witnesses.

HAAKON A. MARTIN.

Witnesses:
R. C. GLASS,
CARL W. BEUST.

Copies of this patent may be obtained for five cents each, by addressing the "Commissioner of Patents, Washington, D. C."